United States Patent
Ooi et al.

(10) Patent No.: US 6,606,424 B2
(45) Date of Patent: *Aug. 12, 2003

(54) APPARATUS AND METHOD FOR OPTICAL MODULATION AND DEMODULATION

(75) Inventors: Hiroki Ooi, Kanagawa (JP); Minoru Seino, Kanagawa (JP); George Ishikawa, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/516,588

(22) Filed: Mar. 1, 2000

(65) Prior Publication Data

US 2003/0091259 A1 May 15, 2003

(30) Foreign Application Priority Data

Mar. 1, 1999 (JP) ............................................. 11-052719

(51) Int. Cl.[7] .............................................. G02F 1/035
(52) U.S. Cl. .............................................. 385/3; 385/40
(58) Field of Search ............................. 385/1–3, 40, 45

(56) References Cited

U.S. PATENT DOCUMENTS

| 5,408,544 A | | 4/1995 | Seino | |
| 5,778,113 A | * | 7/1998 | Yu | .................. 385/3 |
| 5,867,534 A | * | 2/1999 | Price et al. | .................. 359/185 |

FOREIGN PATENT DOCUMENTS

| JP | 3-200923 | | 9/1991 | | |
| JP | 03200923 A | * | 9/1991 | ........... | G02F/1/035 |
| WO | WO 99/09682 A1 | * | 2/1999 | ........... | H04B/10/04 |

OTHER PUBLICATIONS

A. J. Price et al., "Reduced Bandwidth Optical Digital Intensity Modulation with Improved Chromatic Dispersion Tolerance", Electronics Letters, Jan. 5, 1995, vol. 31, No. 1, pp. 58–59.

G. Ishikawa, et al., "80–Gb/s (2x40–Gb/s) Transmission Experiments Over 667–km Dispersion–Shifted Fiber Using Ti:LiNbO$_3$ OTDM Modulator and Demultiplexer", ThC.3.3., 22nd European Conference on Optical Communication, ECOC '96, Oslo.

* cited by examiner

Primary Examiner—Alan E. Ullah
Assistant Examiner—Michelle R. Connelly
(74) Attorney, Agent, or Firm—Staas & Halsey, LLP

(57) ABSTRACT

In the case in which independent driving voltages are applied to electrodes that are provided in waveguides #1 and #2 of a Mach-Zehnder optical modulator, light passing through the waveguide #1 and light passing through the waveguide #2 undergo the same amount of phase modulation of opposite signs (positive and negative) while a driving voltage $E_1$ is applied. Similarly, the Mach-Zehnder optical modulator is configured so that when a driving voltage $E_2$ is applied, phase modulation provided to the light passing through the waveguide #1 and phase modulation provided to the light passing through the waveguide #2 are offset after these lights are coupled. With this configuration, the amount of phase modulation provided by the Mach-Zehnder optical modulator is always kept at "0", resulting in that chirping, which is defined as the differentiation of a phase modulation amount with respect to time, does not occur. Therefore, deterioration caused by chirping in a waveform can be prevented.

29 Claims, 25 Drawing Sheets

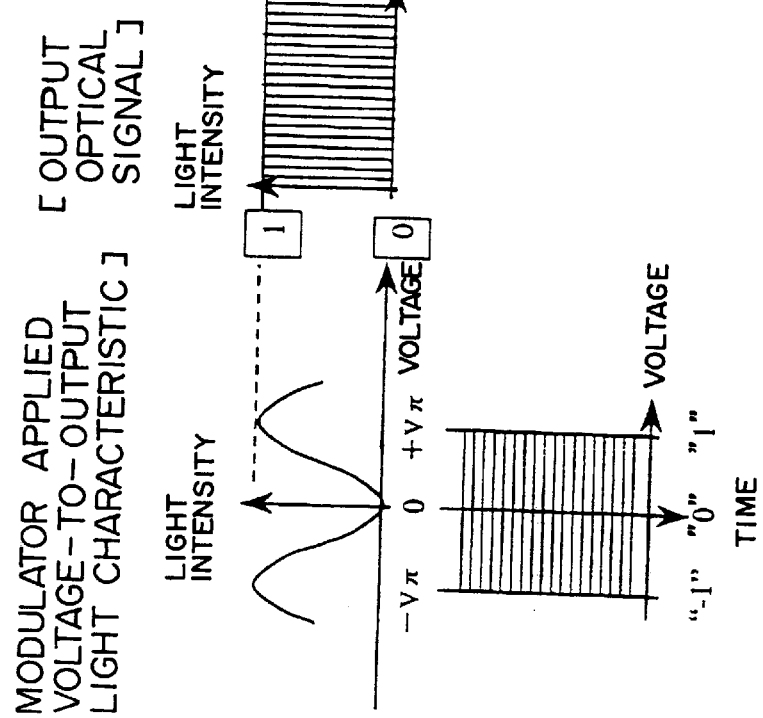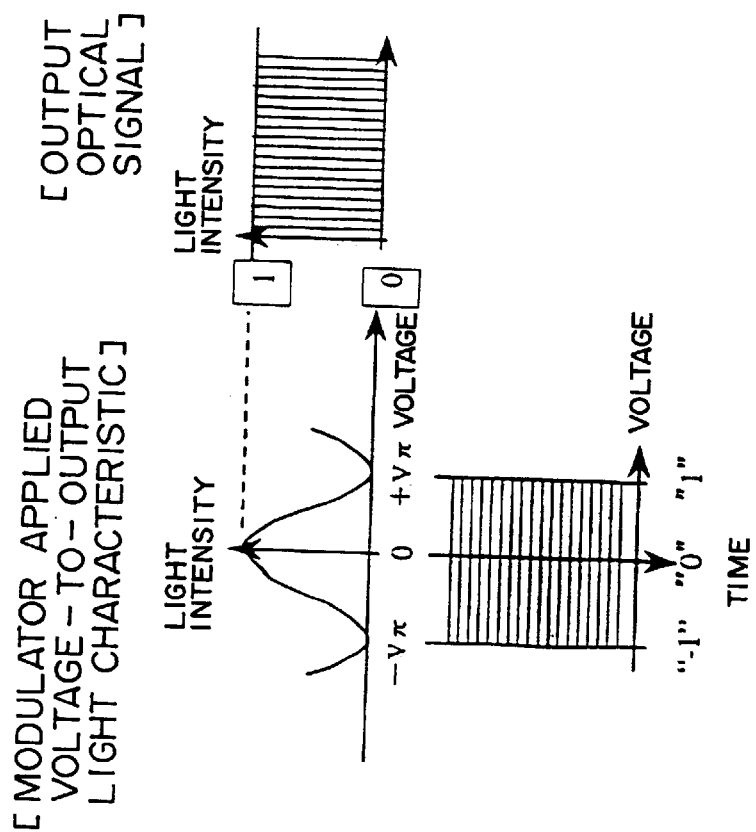
FIG. 3  PRIOR ART

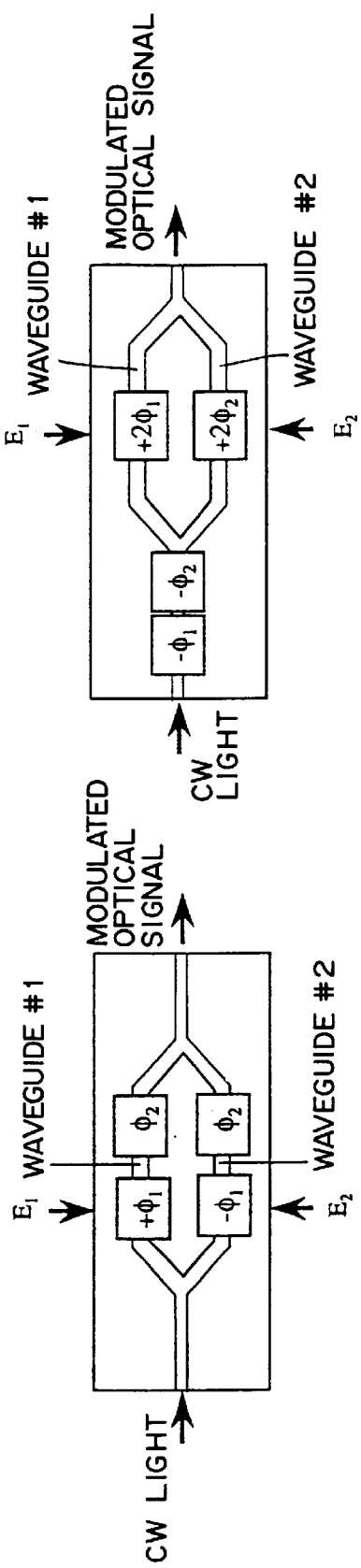
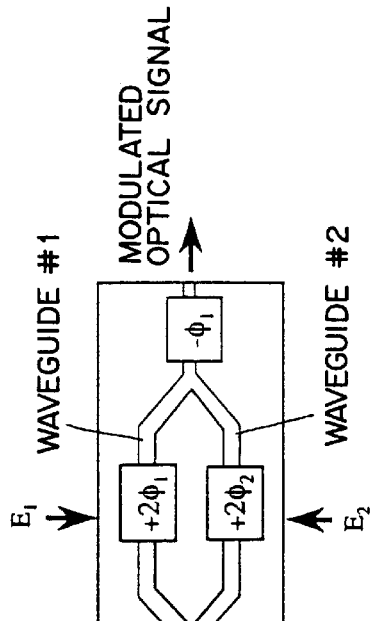
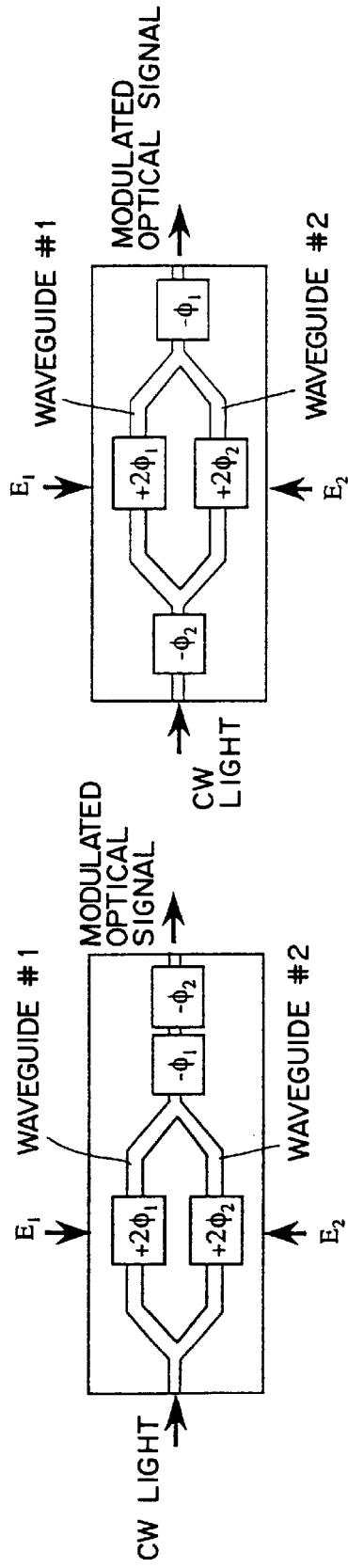

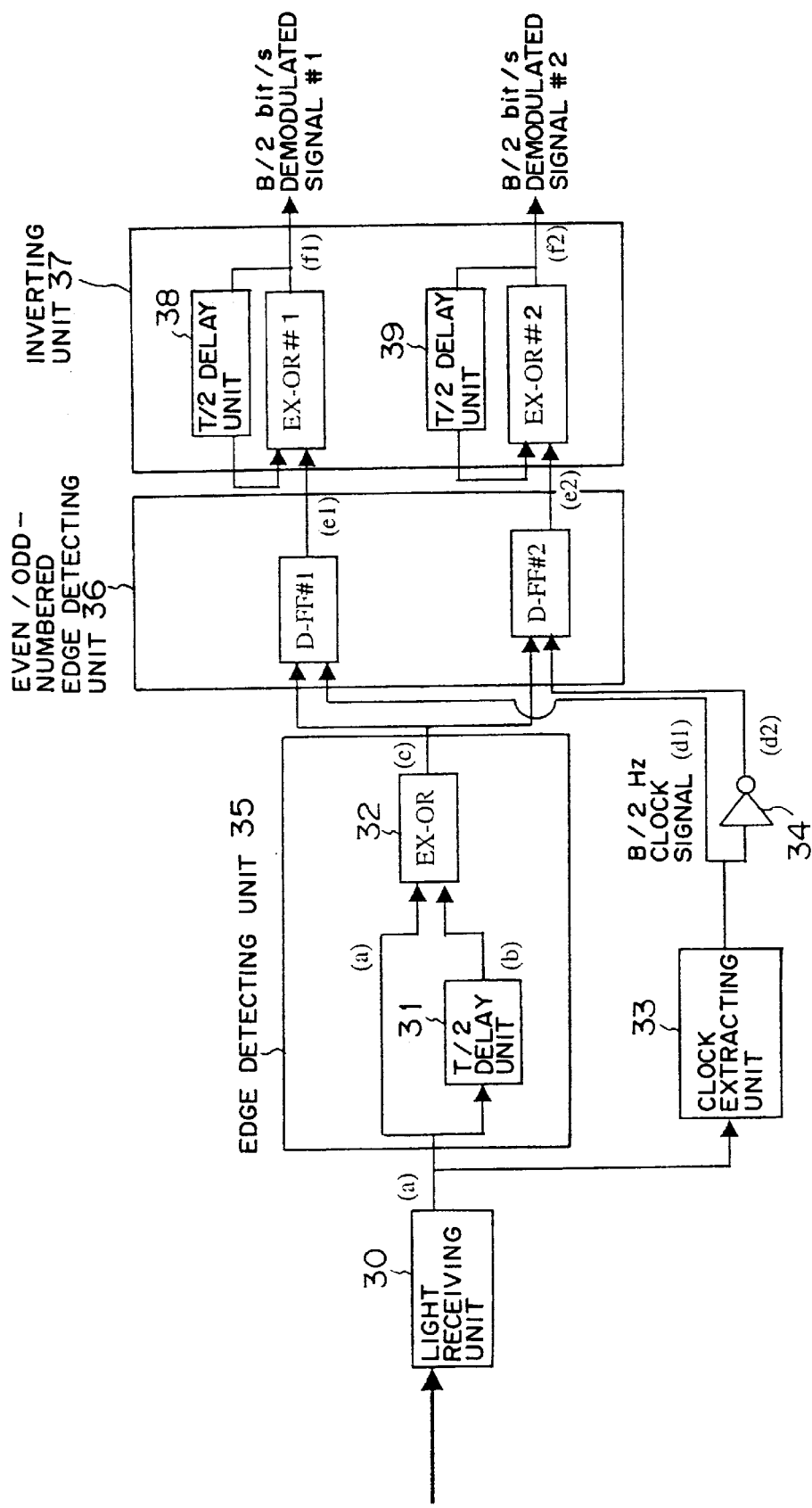
F I G. 24

APPARATUS AND METHOD FOR OPTICAL MODULATION AND DEMODULATION

BACKGROUND OF THE INVENTION

1. Field of the Invention

The present invention relates to an optical communication apparatus, and particularly to an optical modulation method using a Mach-Zehnder optical modulator, which is designed for a time division multiplexing optical transmitter in an optical transmission system.

2. Description of the Related Art

As the amount of information has significantly increased, demand for a large-capacity and long-distance optical communication system has increased in recent years. An optical amplification relay system having a transmission rate of 10 Gbit/s is now being put to practical use. The need for an optical communication system having a larger capacity is expected to increase hereafter, and both a time division multiplexing (TDM) optical communication system and a wavelength division multiplexing (WDM) optical communication system are in the research and development stage.

To achieve a large-capacity optical communication system such as that having a transmission rate of 40 Gbit/s by means of the time division multiplexing (TDM) system, some technical problems must be solved, including the following two major problems:

(1) Implementing electronic and optical devices operating at very high speed in an optical transmitter/receiver.

(2) Overcoming factors restricting transmission distance of a transmission line fiber (chromatic dispersion, nonlinear effect, and polarized wave dispersion).

As to (1), the operating speed of an optical communication system is restrained by the limit of the operating speed of an electronic device rather than an optical device, at present. To overcome this problem, some methods were devised, including an optical time division multiplexing (OTDM) modulation method (G. Ishikawa et al., ECOC '96 Post-deadline papers, TuC 3.3, pp. 37–40, 1996), which generates an optical signal of 40 Gbit/s by using only an electronic device having a band of 20 Gbit/s and by multiplexing light on a time axis.

Regarding chromatic dispersion (i.e. GVD) as set forth in (2), dispersion tolerance is in inverse proportion to the square of a bit rate. A 10 Gbit/s system has a dispersion tolerance of approximately 800 ps/nm, while the dispersion tolerance of a 40 Gbit/s system is one-sixteenth of that of the 10 Gbit/s system, that is, approximately 50 ps/nm. Narrowing the band of a signal light spectrum is effective in reducing deterioration in a waveform caused by chromatic dispersion. As one of the methods to attain this, an optical duo-binary modulation method is in the research and development stage. (For example, A. J. Price et al., "Reduced bandwidth optical digital intensity modulation with improved chromatic dispersion tolerance", Electron. Lett., Vol. 31, No. 1, pp. 58–59, 1995)

In this method, narrow-band ternary electric driving signals are generated by causing an electric input signal to pass through a low-pass filter for a band which is approximately one-fourth of a bit rate. Furthermore, an optical modulation is performed with amplitude, which is double the amplitude for the voltage (Vπ voltage) at which light is turned on/off in the Mach-Zehnder modulator, and driving is performed so that electric signals of 3 values, "0", "0.5", and "1" correspond to optical signals of values, "−1", "0", and "1", respectively. Therefore, in optical modulation, the bandwidth of a signal spectrum is reduced to approximately half, and dispersion tolerance can be increased to double or more of that in the NRZ modulation method. When a large capacity is achieved by the wavelength division multiplexing (WDM) technique, signal channels can be arranged more densely within the bandwidth of amplification by an optical amplifier by using a narrow-band spectrum of an optical signal such as that used in the optical duo-binary modulation method. However, the optical duo-binary modulation method has some problems, as follows. The optical duo-binary modulation method requires a high-speed electric device having the same bit rate as that of an optical signal, as the NRZ modulation method requires. To ideally perform push-pull driving at both the electrodes, the amplitude and phase of two driving signals must coincide precisely, resulting in that an electric driving system must meet strict demands. Furthermore, intersymbol interference of a waveform is large since, in principle, an optical modulation waveform is asymmetrical with respect to the upper half and lower half, and the cross point of signal waveforms in an eye-opening diagram is on the ON-side above the central level.

FIGS. 1 through 4E show one of the modulation methods to solve the above described problems. For further details regarding such a modulation method, refer to Japanese Patent Laid-open No. 3-200923 in publication.

First, as shown in FIG. 1, a binary electric signal having a bit rate of B/2(b/s) is inputted, as an input signal #1, to one of the input electrodes of a double-sided electrode Mach-Zehnder optical modulator. The input signal #1 is amplified by an amplifier AMP 1, and is applied to a double-sided drive Mach-Zehnder optical modulator, as an electric signal $E_1t$. A binary electric signal (input signal #2) having a bit rate of B/2(b/s) is amplified by an amplifier AMP 2, delayed by a half-bit shift delay element (T/2 delay element) by half a bit, and applied to the other input electrode of the double-sided drive Mach-Zehnder optical modulator. Continuous (CW) light is inputted, as $E_0$, to an optical input terminal of a push-pull type Mach-Zehnder optical modulator. This CW light is modulated by input signals $E_1(t)$ and $E_2(t)$ which are inputted to the push-pull type Mach-Zehnder optical modulator, and a modulated optical signal P(t) is outputted. The bit rate of the modulated optical signal P(t) is B(b/s).

FIG. 2 shows the operation of the double-sided drive Mach-Zehnder optical modulator using a half-bit shift multiplexing method.

As shown in a voltage-to-light intensity graph in FIG. 2, the light intensity in the double-sided drive Mach-Zehnder optical modulator periodically varies in accordance with a trigonometric function, depending on the difference between voltages applied to both the electrodes. When light intensity modulation is performed, an electric signal within a voltage range of Vπ, at which light intensity becomes "0", and—Vπ, including a voltage ("0" voltage in FIG. 2) at which light intensity becomes "1" as the center of the range, is used. Intensity-modulated light, the light intensity of which varies between an extinction state (a state of "0") and a state of maximum intensity (a state of "1"), is obtained by causing the voltage which is applied to both the electrodes to vary between Vπ and −Vπ.

Alternatively, a voltage signal within a voltage range of Vπ, at which light intensity becomes "1", and—Vπ, including a voltage at which light intensity becomes "0" as the center of the range, may be used as used in a modulation method 2 as shown in FIG. 3. A modulation method 1 is described below.

FIGS. 4A through 4E show the half-bit shift modulation method.

FIG. 4A shows the light intensity of CW light which is continuous light having a constant amplitude (light intensity). FIG. 4B illustrates a variation in amplitude of the input electric signal $E_1(t)$ as shown in FIG. 1. FIG. 4B assumes that an NRZ signal (1100100) is inputted, the bit rate of the NRZ signal is B/2(b/s), and the time slot length of one symbol is 2T=2/B(sec). Meanwhile, FIG. 4C illustrates a variation in amplitude of the input electric signal $E_2(t)$ as shown in FIG. 1. FIG. 4C assumes that an NRZ signal (01001010) is inputted, the bit rate of the NRZ signal is the same as that of the input electric signal #1, and the time slot length of one symbol is 2T=2/B(sec). Light modulation is affected by the difference between the above described input electric signals which are applied to both the electrodes of the double-sided drive Mach-Zehnder optical modulator. FIG. 4D shows the difference between the amplitudes of the input electric signals $E_1(t)$ and $E_2(t)$. As shown in FIG. 4D, an electric signal having a bit rate of B(b/s) (the time slot length of one symbol is given by: T=1/B(sec)), which is twice as large as the bit rate of the input electric signals $E_1(t)$ and $E_2(t)$, is applied to the push-pull type Mach-Zehnder optical modulator. FIG. 4E shows how CW light ($E_0$ as shown in FIG. 4A) is modulated when the voltage difference as shown in FIG. 4D is applied to both the electrodes of the push-pull type Mach-Zehnder optical modulator. When the voltage difference as shown in FIG. 4D is Vπ or −Vπ, the intensity of an optical signal outputted from the push-pull type Mach-Zehnder optical modulator is "0", as shown in FIG. 2. Therefore, as shown in FIG. 4E, the intensity of an optical signal P(t) is in the extinction state (light intensity is "0") when the voltage difference, as shown in FIG. 4D, is Vπ or −Vπ. However, as is clear from FIG. 2, an optical signal P(t) having the maximum light intensity is outputted when the voltage difference is "0". Thus, an optical signal P(t) having a desired bit rate (a bit rate becomes B(b/s)) can be generated by combining electric signals having a bit rate of B/2(b/s). For example, an electronic device having an operating rate of 20 Gbit/s is sufficient to generate a 40 Gbit/s optical signal, thereby significantly reducing demand for an electric driving system. This modulation method is referred to as the "half-bit shift multiplexing modulation method" hereinafter.

FIG. 5 shows a configuration of the double-sided electrode Mach-Zehnder optical modulator for use in the half-bit shift multiplexing modulation method of prior art, which is the same as that for use in NRZ modulation.

Two independent electric signals #1 and #2 having amplitude of Vπ and a bit rate of B/2(b/s) with a delay of a half time slot between each, are inputted to two signal electrodes #1 and #2 of the double-sided electrode Mach-Zehnder optical modulator. The Mach-Zehnder optical modulator has an applied voltage-to-light intensity characteristic that an applied voltage and light intensity periodically vary in accordance with a trigonometric function, as shown in FIG. 2. Here, the applied voltage corresponds to the potential difference between the input electric signals #1 and #2.

The half-bit shift multiplexing modulation method has the advantage that modulation can be performed only by using a slow-speed electronic device, resulting in that dispersion tolerance becomes large because a signal spectrum band becomes narrow. However, there is a problem that when half-bit shift multiplexing modulation is performed by using the conventional Mach-Zehnder optical modulator of a double-sided drive and electrode configuration as shown in FIG. 5, significant waveform deterioration arises compared to other modulation methods (optical duo-binary and NRZ) if chromatic dispersion exists in optical paths. This problem arises because in the half-bit shift multiplexing modulation method, voltages which are not in synchronization with each other are applied to both electrodes of the Mach-Zehnder optical modulator, resulting in two separate signals, thereby causing substantially the same operation as that in the case of combining two one-sided electrode drive Mach-Zehnder optical modulators.

FIG. 6 shows the relationship between a total chromatic dispersion amount and an eye-opening penalty in each modulation method.

FIG. 6 shows transmission waveform simulation in which deterioration in an optical signal that is received after being transmitted through an optical fiber is examined in an eye pattern by changing the length of the optical fiber having prescribed dispersion characteristics. A back-to-back eye-opening degree in the NRZ modulation method is used as a common criterion of a chromatic dispersion-to-eye-opening penalty in the transmission waveform simulation. Here, the term "back-to-back" refers to a state in which there is no optical fiber between a transmitter and a receiver, and substantially refers to an input signal itself. It is understood from FIG. 6 that dispersion tolerance (for example, a range of transmission line dispersion, in which the eye-opening penalty is 1 dB or less) in the half-bit shift multiplexing modulation method is small compared with other modulation methods (optical duo-binary and NRZ).

FIG. 7 shows an equalized waveform indicating deterioration in a waveform at the receiving end in each modulation method.

In the half-bit shift multiplexing modulation method, deterioration in a waveform for both positive and negative transmission line dispersion is significant and dispersion tolerance (for example, a range of transmission line dispersion, in which the eye-opening penalty is 1 dB or less) becomes small, compared with the NRZ modulation method and the optical duo-binary modulation method. Note that FIG. 7 shows the waveform in the half-bit shift multiplexing modulation method and NRZ modulation method for the band of 0.67 B and the waveform in the optical duo-binary modulation method for the band of 0.25 B. This is because transmission waveform simulation was performed for a band which causes the least deterioration in a waveform since it is well-known that 0.25 B is an optimum band for the optical duo-binary modulation method.

The reason why the half-bit shift multiplexing modulation method causes greater waveform deterioration, compared with other modulation methods, is explained with formulas below. When the electric field component of coherent (CW) light inputted to an optical modulator is given as $$E_{in} = E_0 \cdot \exp(i\omega_0 t)$$

(i is the imaginary unit, and $\omega_0$ is the angular frequency of a carrier), the electric field components of the optical signal undergoing phase modulation $\phi_A(t)$ and $\phi_B(t)$ by a driving electric signal at signal electrodes #1 and #2 of the optical modulator are represented as follows:

signal electrode #1: $E_0/\sqrt{2} \cdot \exp(i(\omega_0 t + \phi_A))$ signal electrode #2: $E_0/\sqrt{2} \cdot \exp(i(\omega_0 t + \phi_B))$ The electric field component of an optical signal outputted from the optical modulator can be represented as follows:

$$E_{out} = E_0/2 \cdot \exp(i(\omega_0 t + \phi_A)) + E_0/2 \cdot \exp(i(\omega_0 t + \phi_B)) = \quad (1)$$

$$E_0/2\{\exp(i\phi_A) + \exp(i\phi_B)\} \cdot \exp(i\omega_0 t) =$$

$$E_0/2\{(\cos\phi_A + \cos\phi_B) + i \cdot (\sin\phi_A + \sin\phi_B)\} \cdot \exp(i\omega_0 t)$$

Therefore, the intensity P(t) and phase φ(t) of the output optical signal are represented as follows:

$$P(t)=(E_0/2)^2 \cdot \{(\cos\phi_A+\cos\phi_B)^2+(\sin\phi_A+\sin\phi_B)^2\}=E_0/2 \{1+\cos(\phi_A-\phi_B)\}=E_0^2 \cdot \cos^2((\phi_A-\phi_B)/2) \quad (2)$$

$$\Phi(t)=\tan^{-}\{(\sin\phi_A+\sin\phi_B)/(\cos\phi_A+\cos\phi_B)\}=\tan^{-}\{\sin((\phi_A+\phi_B)/2)/\cos((\phi_A+\phi_B)/2)\}=(\phi_A+\phi_B)/2 \quad (3)$$

Wavelength chirping Δλ is represented as follows:

$$\Delta\lambda(t)=\Delta(2\pi c'/\omega)=-(2\pi c'/\omega^2)\cdot\Delta\omega=-(2\pi c'/\omega^2)\cdot d\phi(t)/dt=-(\pi c'/\omega^2)\cdot(d\phi_A/dt+d\phi_B/dt) \quad (4)$$

(c': propagation velocity of light within an optical fiber)

The optical modulator, having a double-sided drive configuration, for use in the conventional NRZ modulation method as shown in FIG. 5 keeps the above described chirping constant, at 0, by using push-pull drive (by using two signals, which are the inverse of one another, as electric signals to be inputted to both sides). That is, $$\phi_A(t)=\pi/2 \cdot E(t)$$

$$\phi_B(t)=-\pi/2 \cdot E(t)$$

E(t): input electric signal ON: E=1, OFF: E=0

$$P(t)=E_0^2/2 \cdot \{1+\cos(\pi \cdot E(t))\} \Delta\lambda(t)=0$$

When the half-bit shift multiplexing modulation is performed by using the conventional double-sided drive optical modulator having the same configuration, independent electric signals $E_1(t)$ and $E_2(t)$ are inputted to both the electrodes. Therefore, unlike the above described case in which the push-pull drive is used, phase modulation is represented as follows:

$$\phi_A(t)=\pi \cdot E_1(t) \quad (5)$$

$$\phi_B(t)=\pi \cdot E_2(t) \quad (6)$$

$$P(t)=E_0^2/2 \cdot \{1+\cos(\pi \cdot (E_1(t)-E_2(t)))\} \quad (7)$$

$$\Delta\lambda(t)=-(\pi^2 c'/\omega^2)\cdot(dE_1(t)/dt+dE_2(t)/dt) \quad (8)$$

$E_1(t)$: input electric signal #1 ON: E=1, OFF: E=0
$E_2(t)$: input electric signal #2 ON: E=1, OFF: E=0

From expression (7), optical signal intensity P(t) depends only on $E_1(t)-E_2(t)$, which is the difference between the input electric signals $E_1(t)$ and $E_2(t)$. Table 1 shows the optical signal intensity P(t) as the combination of $E_1(t)$ and $E_2(t)$.

TABLE 1

|  | P(t) | $E_2(t)$ 0 | $E_2(t)$ 1 |
|---|---|---|---|
| $E_1(t)$ | 0 | 1 | 0 |
|  | 1 | 0 | 1 |

In contrast, it is understood from expression (8) that the wavelength chirping Δλ(t) depends on $dE_1(t)/dt$, which is a change in intensity of the input electric signal $E_1(t)$ at the time of rise and fall, and $dE_2(t)/dt$, which is a change in intensity of the input electric signal $E_2(t)$ at the time of rise and fall, resulting in two types of chirping at the time of a rise ("0"→"1") of the optical signal P(t) generated, specifically, chirping to a long-wavelength side (Δλ>0) and chirping to a short-wavelength side (Δλ<0). In other words, and as shown in the table above, the following four combinations exist in the case of the rise of an optical signal.

(1) While $E_1(t)$ remains unchanged at 0, $E_2(t)$ changes from 1 to 0: Δλ>0
(2) While $E_1(t)$ remains unchanged at 1, $E_2(t)$ changes from 0 to 1: Δλ<0
(3) While $E_2(t)$ remains unchanged at 0, $E_1(t)$ changes from 1 to 0: Δλ>0
(4) While $E_2(t)$ remains unchanged at 1, $E_1(t)$ changes from 0 to 1: Δλ<0

Similarly, two types of chirping, specifically, chirping to the long-wavelength side (Δλ>0) and chirping to the short-wavelength side (Δλ<0) occurs at the time of a fall ("1"→"0") of the optical signal P(t). FIG. 8 gives an example of the same signal patterns as those shown in FIGS. 4A through 4E, and shows the change in the optical signal intensity P(t) and chirping Δλ(t) with the passage of time. It is understood from FIG. 8 that the chirping to a long-wavelength side (Δλ>0) and chirping to a short-wavelength side (Δλ<0) occurs together at the time of both the rise and fall of an optical signal. One of the reasons why dispersion tolerance is very small in the half-bit shift multiplexing modulation method is that since the chirping of Δλ>0 and chirping of Δλ<0 occurs together in the transmission of a signal, this intricately affects the dispersion characteristics of the optical fiber.

As described above, a fiber transmission line has a characteristic that is called chromatic dispersion.

Chromatic dispersion D (ps/nm)>0→The longer the wavelength, the lower the group velocity of the optical signal.

Chromatic dispersion D (ps/nm)<0→The longer the wavelength, the higher the group velocity of the optical signal.

Therefore, in the case of coexistence of the chirping to a long-wavelength side (Δλ>0) and chirping to a short-wavelength side (Δλ<0) at the time of the rise and fall of the eye of an optical signal, significant deterioration in a waveform occurs because a difference in group delay between the two types of chirping arises, resulting in that a waveform is divided in two.

As explained above, to break the present limitations of a high-speed optical communication, a high-speed optical signal must be generated by using an electric circuit having a low operating speed. Therefore, it is desirable to use the half-bit shift multiplexing modulation method, which enables generation of an optical signal having a bit rate being twice as large as that of an electric signal. However, in the half-bit shift multiplexing modulation method, complex wavelength chirping arises, and significant deterioration in a waveform occurs in the transmission of a signal through an optical fiber having dispersion characteristics. This causes some problems, such as the inability to properly receive a signal at the receiving end and the reception of a signal with many errors.

SUMMARY OF THE INVENTION

An object of the present invention is to provide a high-speed optical communication apparatus and method thereof which enable preventing deterioration in the waveform of an optical signal.

The optical modulation apparatus of the present invention comprises a first electrode unit which applies a first driving signal having a prescribed bit rate to a first light path of a Mach-Zehnder optical modulator; a second electrode unit which applies a second driving signal having the prescribed bit rate and a phase which differs from that of the first driving signal by a half time slot, to a second light path of the Mach-Zehnder optical modulator; and a third electrode unit which performs phase modulation for light being transmitted through the light paths provided in the Mach-Zehnder optical modulator so that chirping imparted by the first driving signal to light passing through the first light path and chirping imparted by the second driving signal to light passing through the second light path are offset by each other after the light passing through the first light path and the light passing through the second light path are coupled. The optical modulation apparatus of the present invention is characterized by increasing dispersion tolerance, because of the bit rate of modulated light, which is obtained by applying the first driving signal and second driving signal, being double the prescribed bit rate and because of a ternary optical signal.

The demodulation apparatus of the present invention comprises a photoelectric conversion unit which converts an optical signal received, into an electric signal; an edge detecting unit which detects the rise and fall of the electric signal; an even/odd-numbered edge detecting unit which detects an even-numbered edge signal that is in an even-numbered time position and an odd-numbered edge signal that is in an odd-numbered time position, assuming that all the time positions that are set at intervals of one time slot of the electric signal are numbered; and a demodulation unit which regenerates the first driving signal and the second driving signal which were applied to the optical modulator at the transmitting end, by inverting a first output signal and a second output signal by using the even-numbered edge signal and the odd-numbered edge signal, respectively.

The optical modulation method of the present invention, which is designed for the Mach-Zehnder optical modulator, comprises the steps of: (a) applying a first driving signal having a prescribed bit rate to a first light path of the Mach-Zehnder optical modulator; (b) applying a second driving signal having the prescribed bit rate and a phase which differs from that of the first driving signal by a half time slot, to a second light path of the Mach-Zehnder optical modulator; and (c) performing phase modulation for light being transmitted through the light paths provided in the Mach-Zehnder optical modulator so that chirping imparted by the first driving signal to light passing through the first light path and chirping imparted by the second driving signal to light passing through the second light path are offset by each other after the light passing through the first light path and the light passing through the second light path are coupled. The optical modulation method of the present invention is characterized by increasing dispersion tolerance, because of the bit rate of modulated light, which is obtained by applying the first driving signal and second driving signal, being double the prescribed bit rate and because of a ternary optical signal.

The demodulation method of the present invention comprises the steps of: (a) converting an optical signal received, into an electric signal; (b) detecting the rise and fall of the electric signal; (c) detecting an even-numbered edge signal that is in an even-numbered time position and an odd-numbered edge signal that is in an odd-numbered time position, assuming that all the time positions that are set at intervals of one time slot of the electric signal are numbered; and (d) regenerating the first driving signal and the second driving signal which were applied to the optical modulator at the transmitting end, by inverting a first output signal and a second output signal by using the even-numbered edge signal and the odd-numbered edge signal, respectively.

According to the present invention, by using two independent driving signals having data to be transmitted, an optical signal, the bit rate of which is double that of the driving signals, can be generated, and the use of the ternary optical signal enables increasing dispersion tolerance. Furthermore, the present invention solves the problem of small dispersion tolerance in the optical modulation, caused by significant deterioration in a waveform of a generated optical signal during transmission through an optical fiber under the influence of complex chirping, because the present invention increases dispersion tolerance and achieves long-distance transmission by providing an electrode unit which offsets chirping in a modulation process. Therefore, a high-speed optical signal can be generated by using driving signals generated in a low-speed electric circuit, and can be transmitted for a long distance.

At the receiving end, the optical signal transmitted, as described above, can be demodulated by using the characteristics of the optical modulation method, and the two independent driving signals having data can be regenerated relatively easily.

BRIEF DESCRIPTION OF DRAWINGS

FIG. 3 explains a conventional modulation method;

FIG. 9A is a block diagram showing an example of a principle configuration of a Mach-Zehnder optical modulator according to an embodiment of the present invention;

FIG. 9B is a block diagram showing an example of a principle configuration of the Mach-Zehnder optical modulator according to the embodiment of the present invention;

FIG. 9C is a block diagram showing an example of a principle configuration of the Mach-Zehnder optical modulator according to the embodiment of the present invention;

FIG. 9D is a block diagram showing an example of a principle configuration of the Mach-Zehnder optical modulator according to the embodiment of the present invention;

FIG. 24 shows an example of a configuration of a circuit to implement a demodulation method as shown in FIGS. 23A and 23B and detailed operations thereof (No. 1)

DESCRIPTION OF THE PREFERRED EMBODIMENTS

Figure 1:
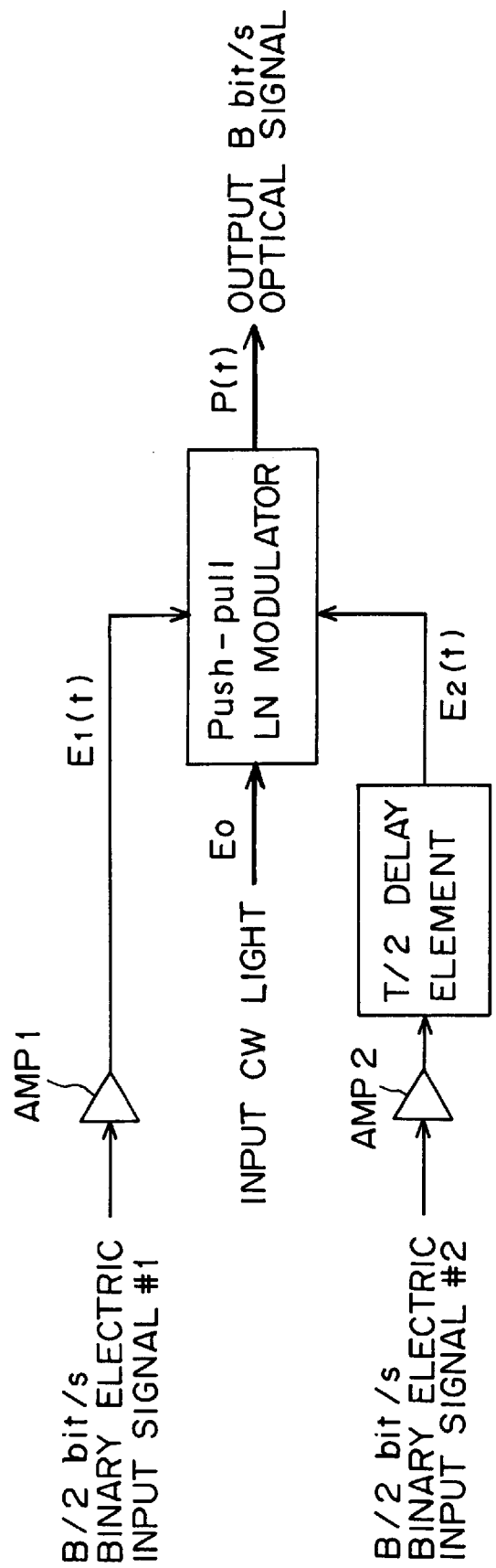
FIG. 1 explains a conventional modulation method.

The half-bit shift multiplexing method can narrow the band for a signal by using a ternary optical signal, resulting in an increase in dispersion tolerance and high-density wavelength division multiplexing. A detailed explanation is given below.

In the case of a multi-valued signal, the frequency density W(f) in a modulation method, in which a signal level has b values, is given as follows (A. Lender, "Correlative Digital Communication Technique", IEEE Trans, Commun. Technol. vol. COM-12, pp. 128–135, 1964.):

$$W(f)=(T/4)\cdot((\sin((b-1)\pi fT))/(\pi fT))^2$$

Accordingly, a spectrum band $\Delta f$ is given by:

$$(b-1)\cdot\pi\cdot\Delta f\cdot T=\pi \therefore \Delta f=1/((b-1)\cdot T)$$

Since the signal level of an NRZ signal has 2 values, "0" and "1", that is, b=2, the spectrum band $\Delta f$ is given by:

$$\Delta f=1/T$$

Since the signal level of a half-bit shift multiplexing signal has 3 values, "−1", "0", and "1", that is, b=3, the spectrum band $\Delta f$ is given by:

$$\Delta f=1/(2T)$$

Therefore, compared to the NRZ signal, the band for the half-bit shift multiplexing signal becomes narrow because of the use of the ternary optical signal, resulting in an increase in dispersion tolerance and the high-density wavelength division multiplexing.

Next, regarding deterioration in a waveform, the half-bit shift multiplexing modulation method has a fundamental problem that chirping occurs at the time of both the rise and fall of input electric signals $E_1(t)$ and $E_2(t)$ because the rise and fall of the input electric signals $E_1(t)$ and $E_2(t)$ are separated with respect to time, in principle. To solve this problem, an optical modulator is required to have a configuration in which electric signals are inputted to both sides and no chirping occurs for either of these electric input signals.

Therefore, it is effective to configure an optical modulator so that push-pull (the same amount with opposite signs) phase modulation is provided to a branch waveguide on both sides for each electric input signal.

FIGS. 9A through 9D are block diagrams showing an example of a principle configuration of a Mach-Zehnder optical modulator according to an embodiment of the present invention.

The amount of phase modulation caused by independent electric input signals $E_1$ and $E_2$ are represented by $\phi_1$ and $\phi_2$ respectively. $-\phi_1$ and $-\phi_2$ represents a phase modulation of the same absolute value as $\phi_1$ and $\phi_2$. $+\phi_1$ and $+\phi_2$ may be replaced with $-\phi_1$ and $-\phi_2$, respectively.

FIG. 9A shows that in response to the input signal $E_1$, phase modulation $+\phi_1$ and $-\phi_1$ are provided to respective branch waveguides, and push-pull modulation is performed. Similarly, in response to the input signal $E_2$, phase modulation $+\phi_2$ and $-\phi_2$ are provided to respective branch waveguides, and push-pull modulation is performed. That is, in response to the input signal $E_1$, phase modulation $\phi_1$ occurs in a waveguide #1 and simultaneously, phase modulation $-\phi_1$ occurs in a waveguide #2 so that the phase modulation provided to an optical signal transmitted through the waveguide #1 and that provided to an optical signal transmitted through the waveguide #2 are offset when these optical signals are coupled. Similarly, in response to the input signal $E_2$ applied to the waveguide #2, phase modulation $\phi_2$ occurs in the waveguide #2 and simultaneously, phase modulation $-\phi_2$ occurs in the waveguide #1 so that the phase modulation provided to an optical signal transmitted through the waveguide #1 and that provided to an optical signal transmitted through the waveguide #2 are offset when these optical signals are coupled. Thus, the differentiation of phase modulation, with respect to time, equals "0" since the phase modulations arising in the two waveguides are kept at "0", resulting in that wavelength chirping is reduced.

FIG. 9B shows a configuration in which in response to the input signal $E_1$, phase modulation $+2\phi_1$ is provided to the upper side branch waveguide #1, and phase modulation $-\phi_1$ is provided to a waveguide through which a coupled optical signal is transmitted. Thus, light passing through the upper side branch waveguide #1 undergoes phase modulation, $+2\phi_1-\phi_1=+\phi_1$, and light passing through the lower side branch waveguide #2 undergoes phase modulation $-\phi_1$. As a result, push-pull modulation is performed since these phase modulations are offset when the light passing through the two branch waveguides is coupled. Similarly, in response to the input signal $E_2$, phase modulation $+2\phi_2$ is performed at the branch waveguide #2, and phase modulation $-\phi_2$ is performed after the coupling of light, resulting in that push-pull modulation is performed. In the case of the input signals $E_1$ and $E_2$ being applied simultaneously, an optical signal passing through the waveguide #1 undergoes phase modulation $\phi_1-\phi_2$ before being outputted as a modulated optical signal. However, an optical signal passing through the waveguide #2 undergoes phase modulation $-\phi_1+\phi_2$ before being outputted as a modulated optical signal. Since the phase modulation of an optical signal after being coupled is represented as the average of the two phase modulations according to expression (3), the phase modulation provided to the optical signal transmitted through the waveguide #1 and that provided to the optical signal transmitted through the waveguide #2 are always offset. Thus, the occurrence of wavelength chirping can be reduced. The phase modulations $\phi_1$ and $-\phi_2$ as shown in FIG. 9B may be performed either before the waveguide branches off or after the optical signals are coupled. FIG. 9C shows a case where both of the two phase modulations are performed before the waveguide branches off, and FIG. 9D shows a case where one of the two phase modulations is performed before the waveguide branches off and the other phase modulation is performed after the optical signals are coupled. In the cases, as shown in FIGS. 9C and 9D, operations similar to those in the case shown in FIG. 9B are performed. That is, when the input signal $E_1$ is applied to the waveguide #1 and the input signal $E_2$ is not applied to the waveguide #2, only phase modulation $\phi_1$, and phase modulation $+2\phi_1$ occur. Similarly, if the input signal $E_1$ is not applied and only the input signal $E_2$ is applied, only phase modulation $-\phi_2$ and phase modulation $+2\phi_2$ occur. Only when the input signals $E_1$ and $E_2$ are applied together, all the phase modulations occur. Therefore, in both us of the cases, as shown in FIGS. 9C and 9D, the optical signal passing through the waveguide #1 undergoes phase modulation $+\phi_1$ and the optical signal passing through the waveguide #2 undergoes phase modulation $-\phi_1$, when only the input signal $E_1$ is applied. Similarly, when only the input signal $E_2$ is applied, the optical signal passing through the waveguide #1 undergoes phase modulation $-\phi_2$ and the optical signal passing through the waveguide #2 undergoes phase modulation $\phi_2$, resulting in that these phase modulations are offset. When the input signals $E_1$ and $E_2$ are applied together, the optical signal passing through the waveguide #1 undergoes phase modulation $\phi_1-\phi_2$ and the optical signal passing through the waveguide #2 undergoes phase modulation $-\phi_1+\phi_2$, resulting in that these phase modulations are offset and wavelength chirping is reduced. Regarding the specific disposition of electrodes, an electrode for causing phase modulation $+\phi_1$ ($+2\phi_1$) and that for causing phase modulation $\phi_1$ may be separately provided so that the input signal $E_1$ is inputted to each of these electrodes. Alternatively, a modulator may be configured with a single electrode. The same is true of the disposition of electrodes for the input signal $E_2$.

An optical modulator having the above described configuration achieves zero chirping regardless of the modulation method of an input driving signal. Therefore, such an optical modulator can be used to increase dispersion tolerance not only in the half-bit shift multiplexing modulation method but also in any other modulation method.

Figure 10:
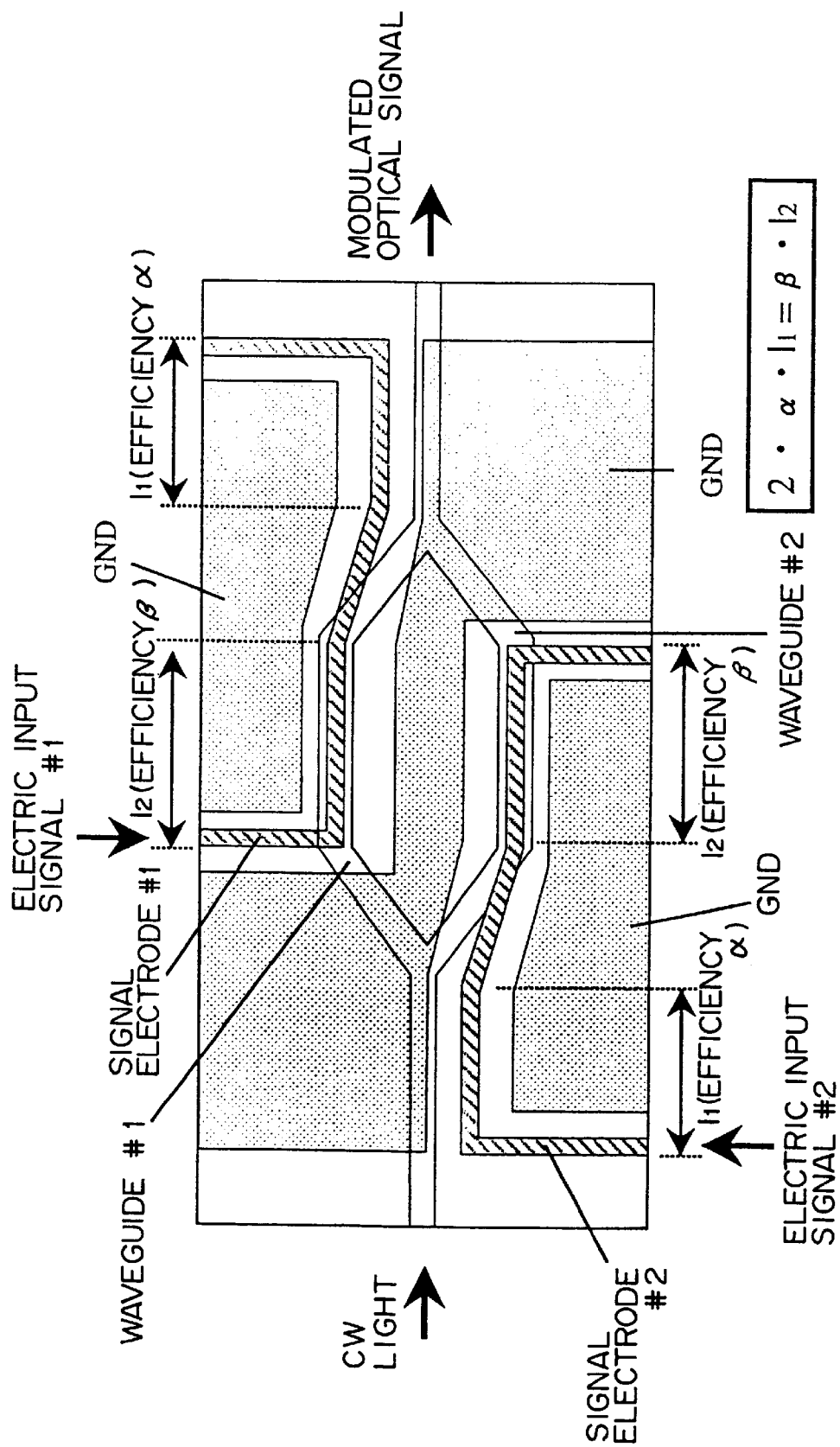
FIG. 10 shows a specific configuration of electrodes of a modulator according to an embodiment of the present invention.

FIG. 10 shows a specific configuration of electrodes of a modulator according to an embodiment of the present invention.

The configuration as shown in FIG. 10 is based on the principle configuration as shown in FIG. 9D.

The configuration of electrodes is designed so that the relationship between electrode length $l_1$ and $l_2$ and respective modulation efficiency $\alpha$ and $\beta$ is given by:

$$2 \cdot \alpha \cdot l_1 = \beta l_2 \tag{9}$$

First, how an electric input signal #1 contributes to modulation is considered. An optical signal passing through the waveguide #1, which is the upper branch of the Mach-Zehnder optical modulator, undergoes phase modulation $\beta \cdot l_2$ at a section having an electrode length of $l_2$, and undergoes phase modulation $-\alpha \cdot l_1$ at a section having an electrode length of $l_1$ after the coupling of optical signals (since the disposition of a signal electrode and a grounding electrode GND in the section having an electrode length of $l_1$ is opposite to that in the section having an electrode length of $l_2$, phase modulation provided at the section having an electrode length of $l_1$ is in the opposite direction to that provided at the section having an electrode length of $l_2$). Therefore, the total amount of phase modulation is given by:

$$\beta \cdot l_2 - \alpha \cdot l_1 = +\alpha \cdot l_1 \; (\because (9)) \tag{10}$$

An optical signal passing through the waveguide #2, which is the lower branch of the Mach-Zehnder optical modulator, undergoes only phase modulation $-\alpha \cdot l_1$ at a section having an electrode length of $l_1$ after the waveguide branches off. Therefore, the optical signals passing through the waveguides #1 and #2 undergo the same amount of phase modulation of the opposite signs (positive and negative), resulting in that push-pull driving is achieved and chirping does not occur. Similarly, chirping does not arise from modulation by an electric input signal #2.

Figure 11:
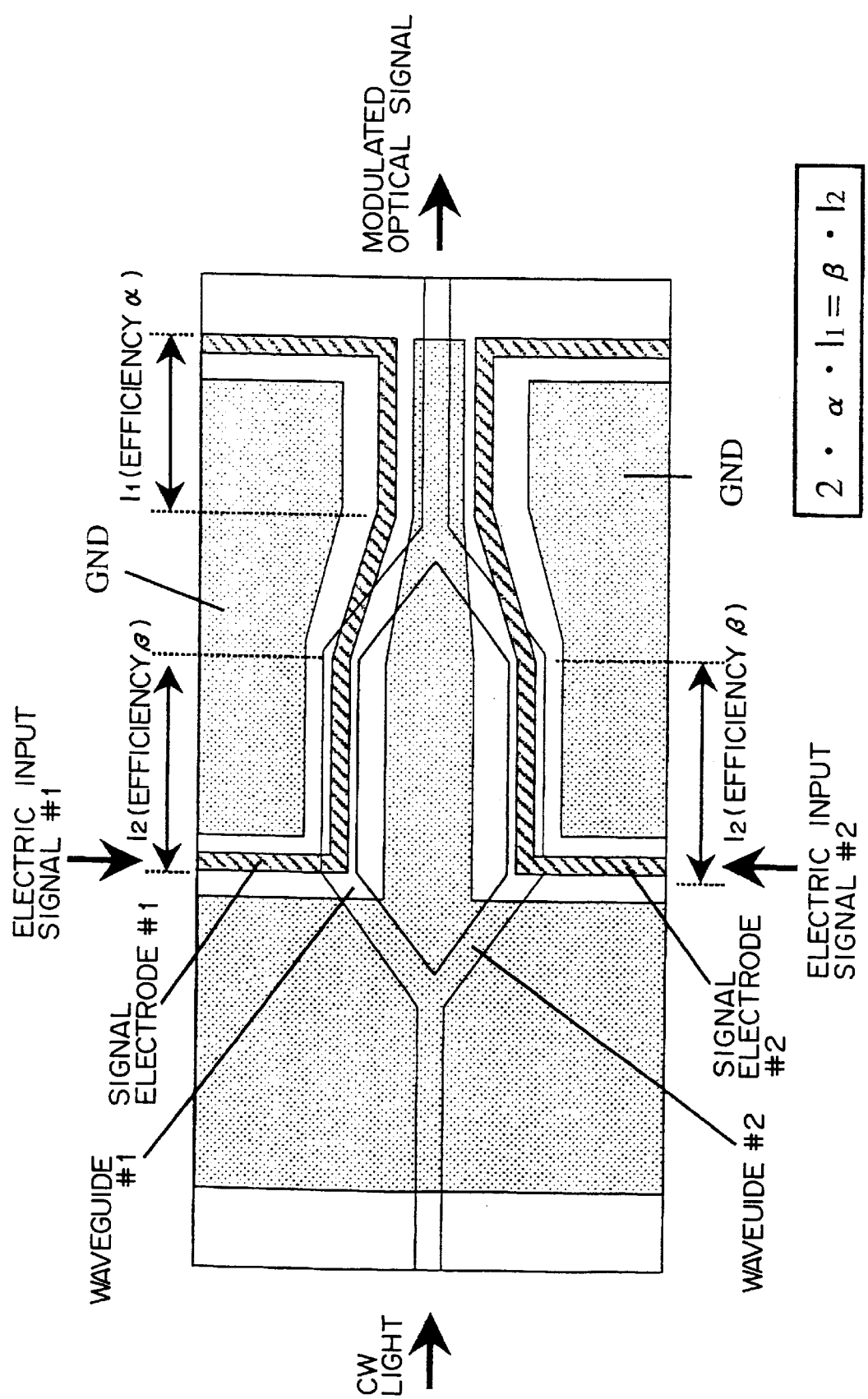
FIG. 11 shows a second example of a specific configuration of a zero chirping modulator.

FIG. 11 shows a specific configuration of electrodes of a modulator according to another embodiment of the present invention. The configuration as shown in FIG. 11 is based on the principle configuration as shown in FIG. 9B. The embodiment as shown in FIG. 11 can be similarly expressed as that of FIG. 10.

Specifically, the embodiment as shown in FIG. 11 is formulated as follows, by rewriting expressions (5) through (8) based on the above explanation.

$$\phi_A(t)=\pi/2 \cdot (+E_1(t)-E_2(t)) \tag{11}$$

$$\phi_B(t)=\pi/2 \cdot (-E_1(t)+E_2(t)) \tag{12}$$

$E_1(t)$: input electric signal #1 ON: E=1, OFF: E=0

$E_2(t)$: input electric signal #2 ON: E=1, OFF: E=0

$$P(t)=E_0^2/2 \cdot \{1+\cos(\phi_A-\phi_B)\}=E_0^2/2 \cdot \{1+\cos(\pi \cdot (E_1(t)-E_2(t)))\} \tag{13}$$

$$\Phi(t)=(\phi_A+\phi_B)/2=0 \tag{14}$$

Thus, chirping (expression (14)) can be reduced to zero, while the light intensity waveform P(t) is represented by the same expression as expression (7).

Figure 12:
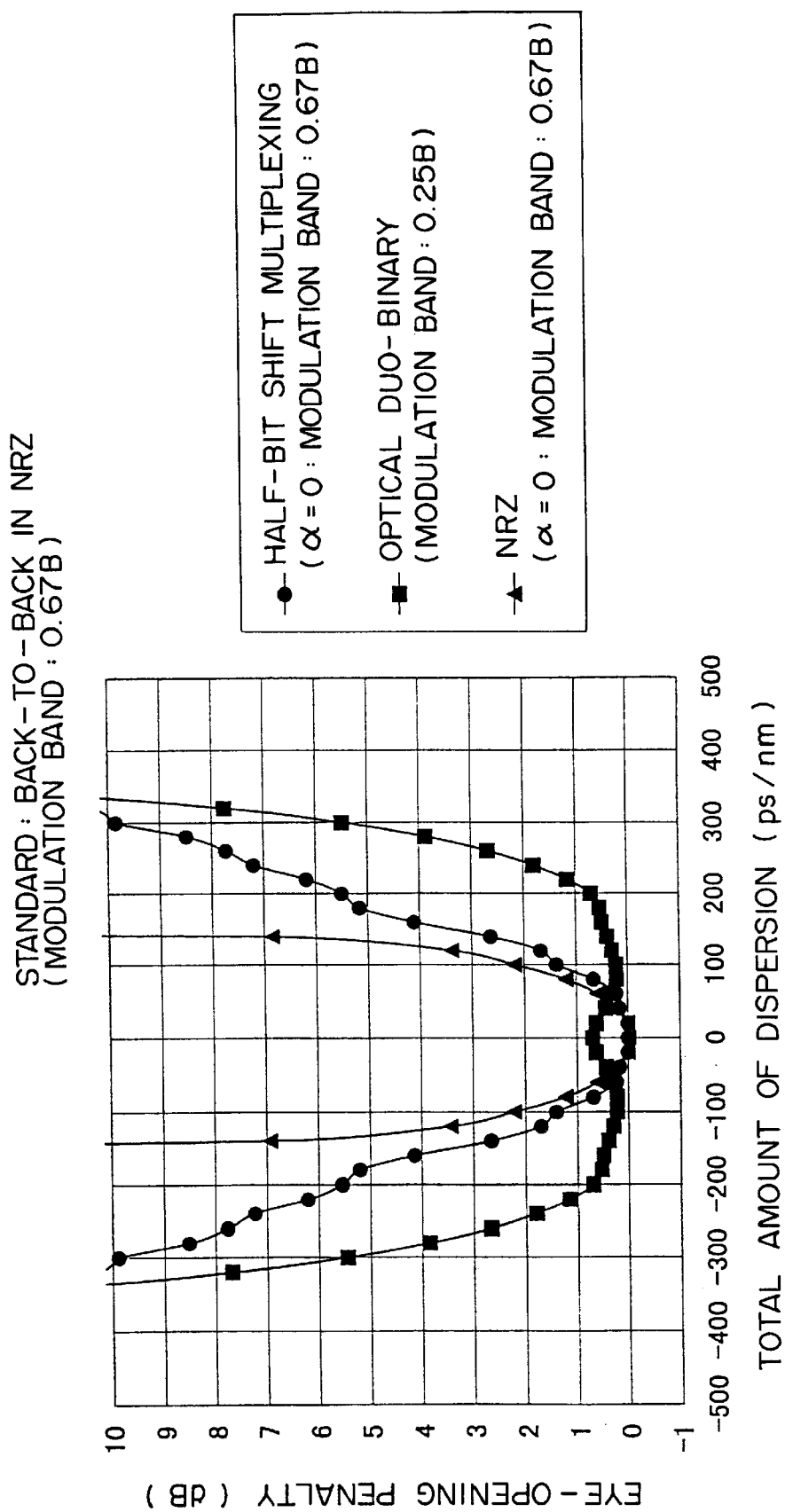
FIG. 12 shows dispersion tolerance in each modulation method, including the half-bit shift multiplexing modulation method in which the Mach-Zehnder optical modulator according to the embodiment of the present invention is used.
Figure 13:
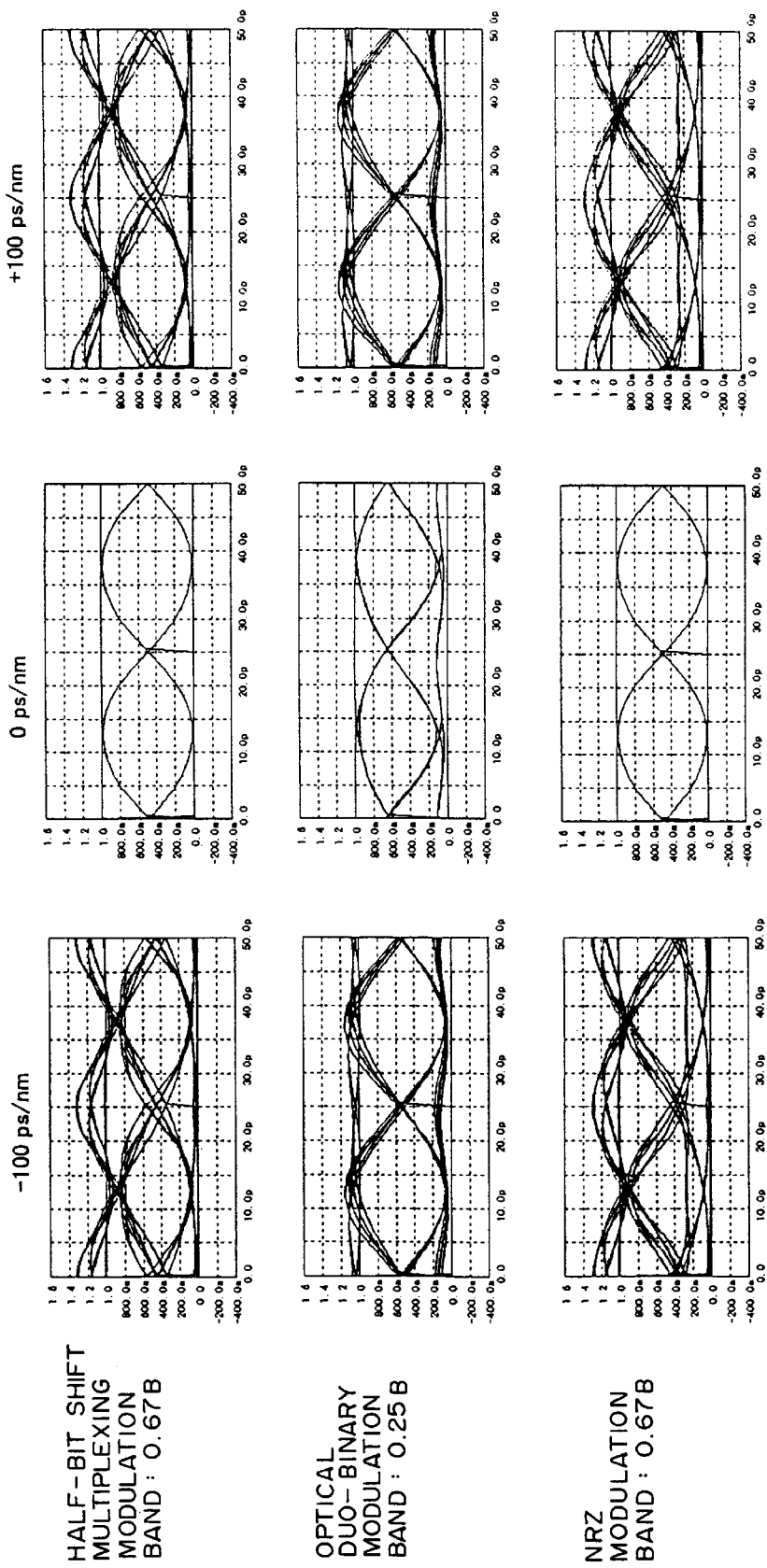
FIG. 13 shows an eye diagram for each modulation method, including the half-bit shift multiplexing modulation method in which the Mach-Zehnder optical modulator according to the embodiment of the present invention is used.
Figure 14:
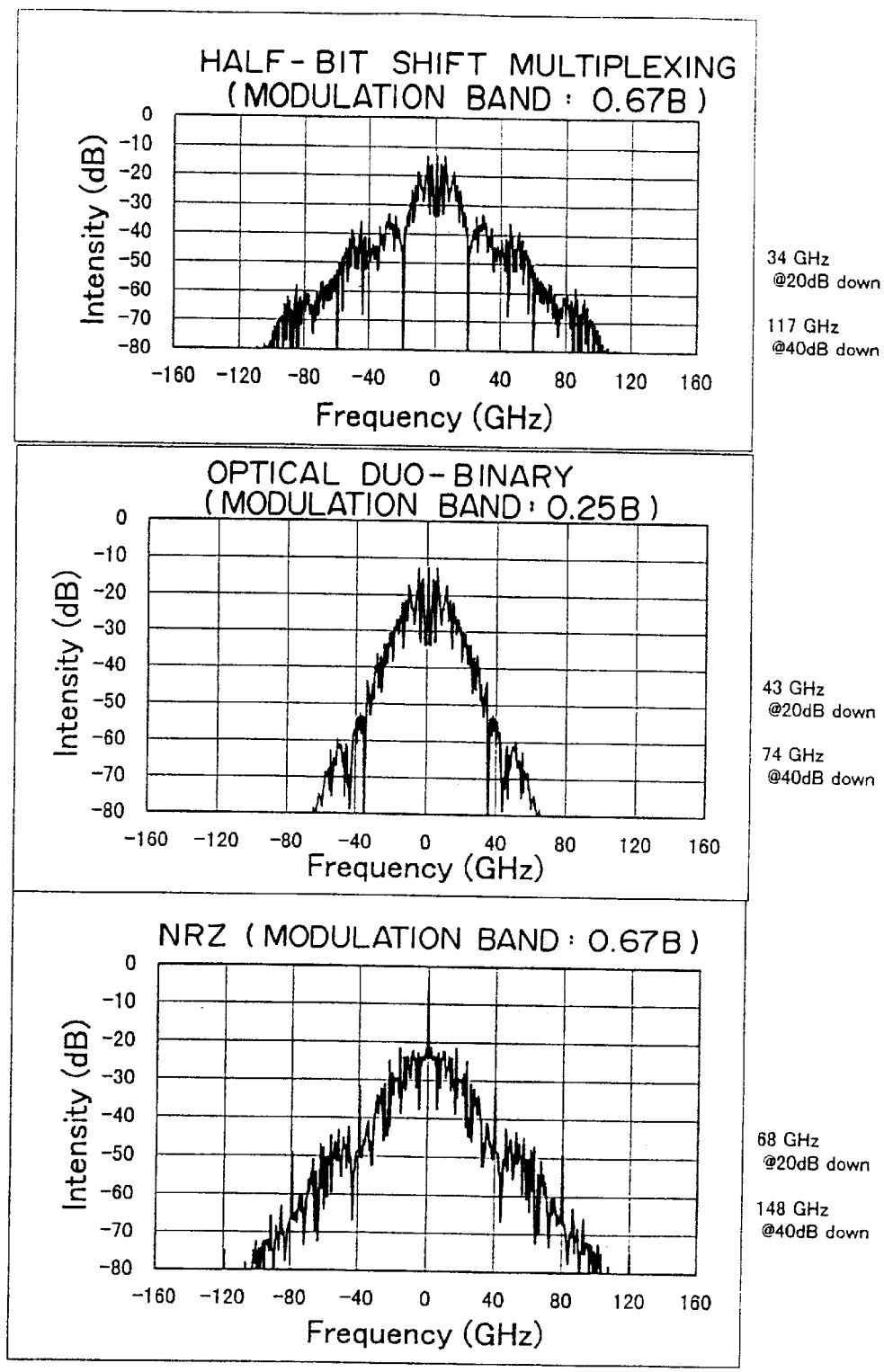
FIG. 14 shows the distribution of a spectrum of an optical signal generated in the half-bit shift multiplexing modulation method, in which the Mach-Zehnder optical modulator according to the embodiment of the present invention is used, and other modulation methods.

FIGS. 12 through 14 show comparisons of dispersion tolerance characteristics, light waveforms, and light spectrums between the 40 Gbit/s half-bit shift multiplexing modulation method and other optical modulation methods (the optical duo-binary modulation method and the NRZ modulation method), which were calculated by using the above described configuration of the Mach-Zehnder optical modulator in a transmission waveform simulation.

FIG. 12 shows the dispersion tolerance for each modulation method, including the half-bit shift multiplexing modulation method in which the Mach-Zehnder optical modulator according to the present embodiment of the present invention is used.

The eye-opening penalty as shown in FIG. 12 is measured on the basis of back-to-back eye-opening degree in the NRZ method (modulation band 0.67 B: where B is a bit rate).

Figure 6:
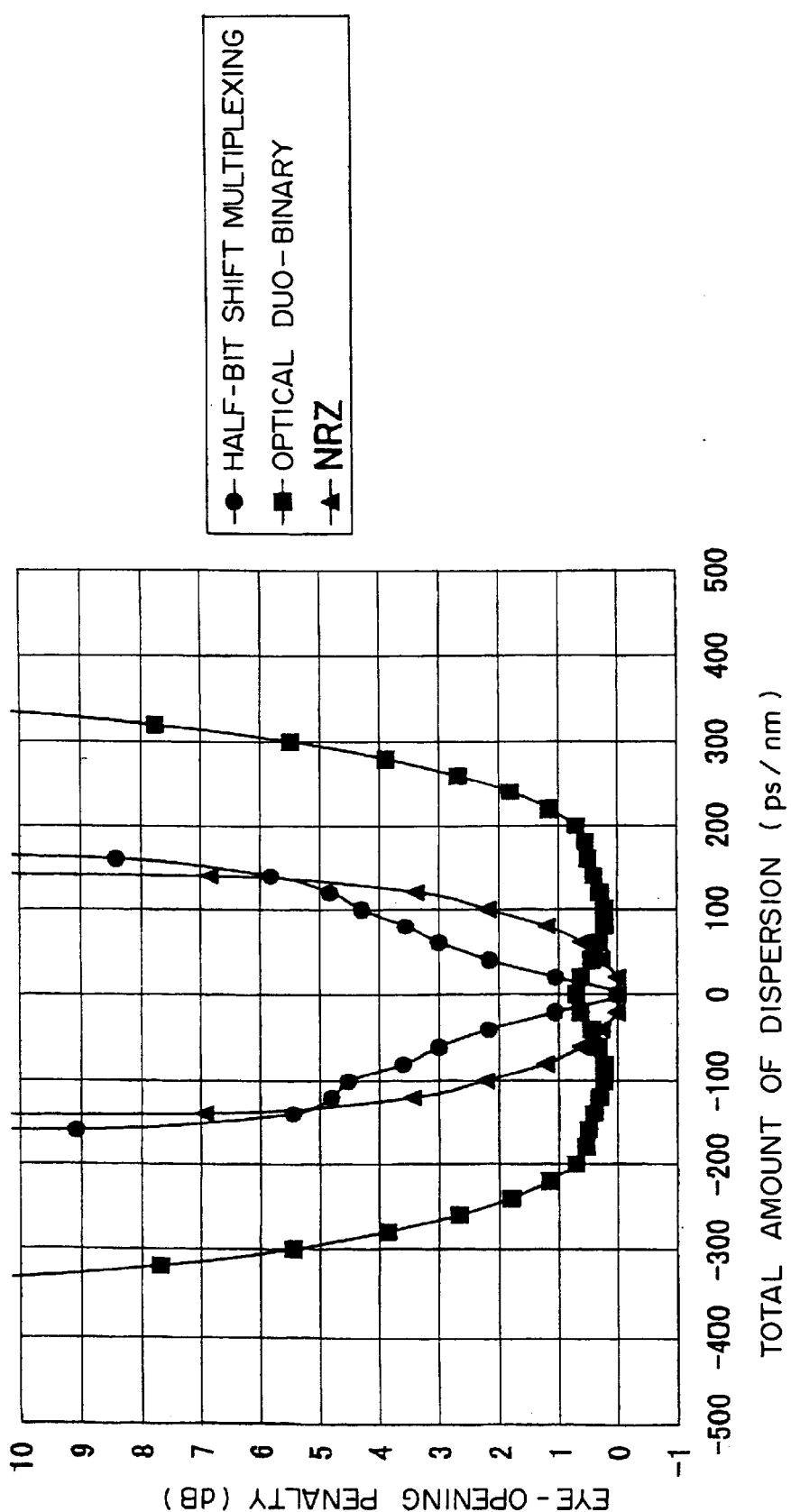
FIG. 6 shows the relationship between a total chromatic dispersion amount and an eye-opening penalty in each modulation method.
Figure 7:
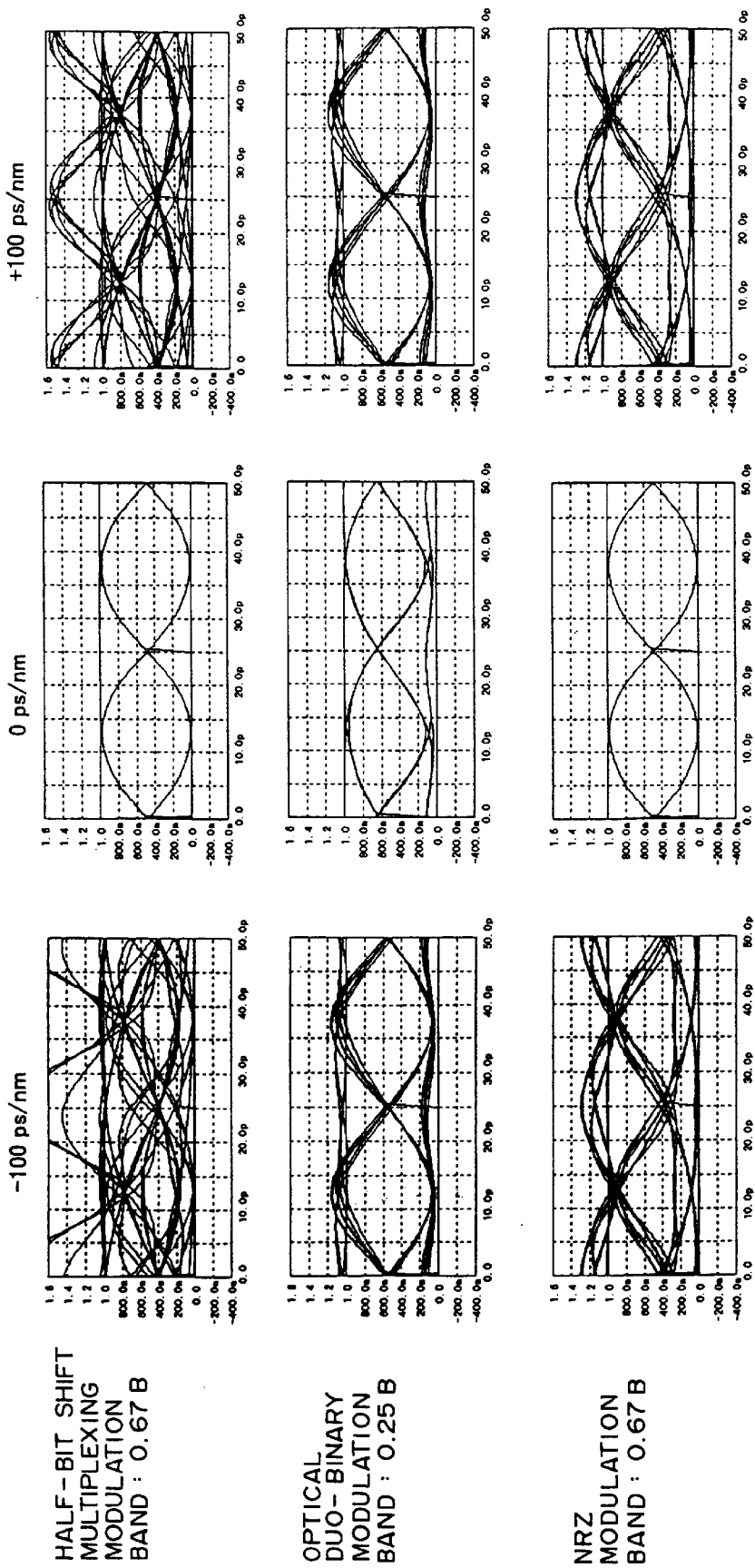
FIG. 7 is an eye diagram showing deterioration in a waveform at the receiving end in each modulation method.
Figure 8:
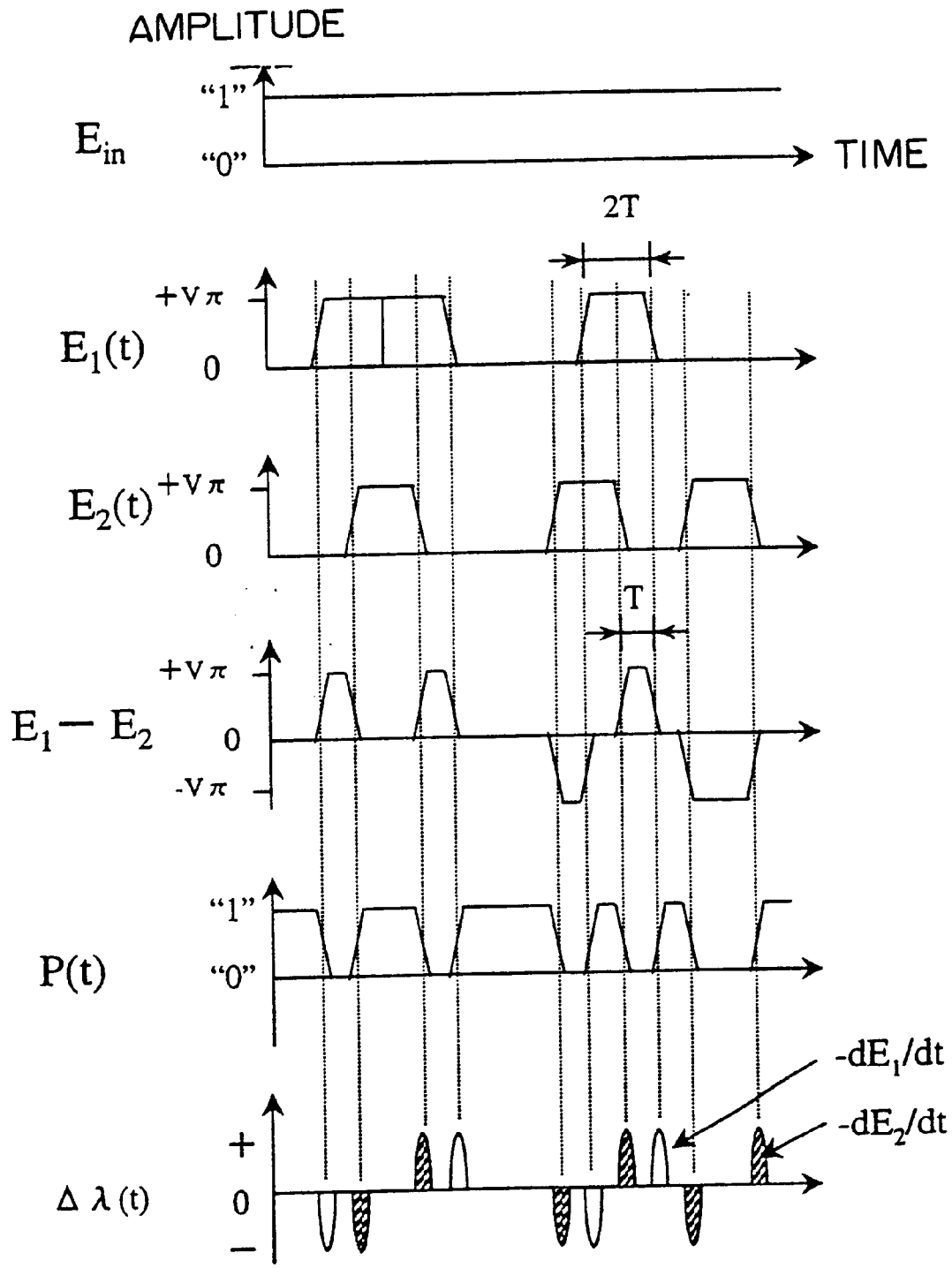
FIG. 8 shows changes in the optical signal intensity P(t) and chirping Δλ(t) with the passage of time in the conventional modulation method.

Dispersion tolerance in the half-bit shift multiplexing modulation method as shown in FIG. 12 is clearly an improvement over that shown in FIG. 6. This is because the electrode configuration according to the present embodiment is used in the half-bit shift multiplexing modulation method as shown in FIG. 12. Modulation methods can be arranged in order of large dispersion tolerance, as follows: the optical duo-binary modulation method>the half-bit shift multiplexing modulation method>the NRZ modulation method.

FIG. 13 shows an eye diagram for each modulation method, including the half-bit shift multiplexing modulation method in which the Mach-Zehnder optical modulator according to the present embodiment is used.

It is obvious from comparison between eye diagrams, as shown in FIG. 13, that in the half-bit shift multiplexing modulation method, the same eye-opening optical modulation waveform as that of an NRZ of a bit rate of B(b/s) is obtained, and dispersion tolerance on the basis of an eye-opening penalty of 1 dB or less is increased to 180 ps/nm, which is approximately 1.2 times as much as that of the NRZ of a bit rate of B(b/s) (refer to FIG. 12).

Here, a high-speed operation characteristic of an electronic device is represented by a frequency band characteristic. In the transmission waveform simulation, the frequency band characteristic is assumed to be a Bessel filter of an upper cut-off frequency Fc(Hz), and an electric driving signal is generated by causing a rectangular digital signal to pass through the filter. The upper cut-off frequency Fc is referred to as a modulation band hereinafter.

FIGS. 12 and 13 assume that the modulation band for the half-bit shift multiplexing modulation is 0.67·B (Hz) (B is a bit rate), which is the optimum value for NRZ modulation. This is equivalent to using, in the half-bit shift multiplexing modulation, an electronic device having a high-speed operation characteristic equal to that of an electronic device used in NRZ modulation. Since the operating speed of an actual electronic device used in the half-bit shift multiplexing modulation is half a bit rate, it is desirable that a band characteristic that an electric device is required to have is approximately half of that of a 40 Gbit/s device.

FIG. 14 shows the distribution of a spectrum of an optical signal generated in the half-bit shift multiplexing modulation method, to which the present embodiment is applied, and other modulation methods.

FIG. 14 shows a case where the modulation band for the half-bit shift multiplexing modulation method and the NRZ modulation method is 0.67 B (B: a bit rate) and the modulation band for the optical duo-binary modulation method is 0.25 B, which is expected to be optimum for the optical duo-binary modulation method.

In the case of the half-bit shift multiplexing modulation method to which the present embodiment is applied, the width of spectrum distribution is 34 GHz when the intensity equals the peak amount less 20 dB. In the case of the optical duo-binary modulation method, the width of spectrum distribution is 43 GHz when the intensity equals the peak amount less 20 dB. In the case of the NRZ modulation method, the width of spectrum distribution is 68 GHz when the intensity equals the peak amount less 20 dB. Thus, when the intensity equals the peak amount less 20 dB, the width of spectrum distribution is narrowest in the half-bit shift multiplexing modulation method to which the present embodiment is applied. Since the effect of chromatic dispersion becomes greater as the width of spectrum distribution becomes large, the characteristics attained in the half-bit shift multiplexing modulation method, to which the present embodiment is applied, are favorable. When the intensity equals the peak amount less 40 dB, the width of spectrum distribution is 117 GHz in the half-bit shift multiplexing modulation method to which the present embodiment is applied, 74 GHz in the optical duo-binary modulation method, and 148 GHz in the NRZ modulation method. Thus, when the intensity equals the peak amount less 40 dB, the width of spectrum distribution is narrowest in the optical duo-binary modulation method. One of the reasons is that the modulation band for the optical duo-binary modulation method is 0.25 B, which is narrower than that for the other modulation methods. In any case, the width of distribution of a spectrum of an optical signal can be reduced and the dispersion tolerance can be significantly improved, by applying the present embodiment to the half-bit shift multiplexing modulation method and by using a ternary optical signal.

As described above, a zero chirping modulator can be used to increase dispersion tolerance not only in the half-bit shift multiplexing modulation method but also in any other modulation method. Furthermore, the zero chirping modulator is applicable to a single-sided drive modulator as well as a double-sided drive modulator such as that used in the half-bit shift multiplexing modulation method.

Figure 15:
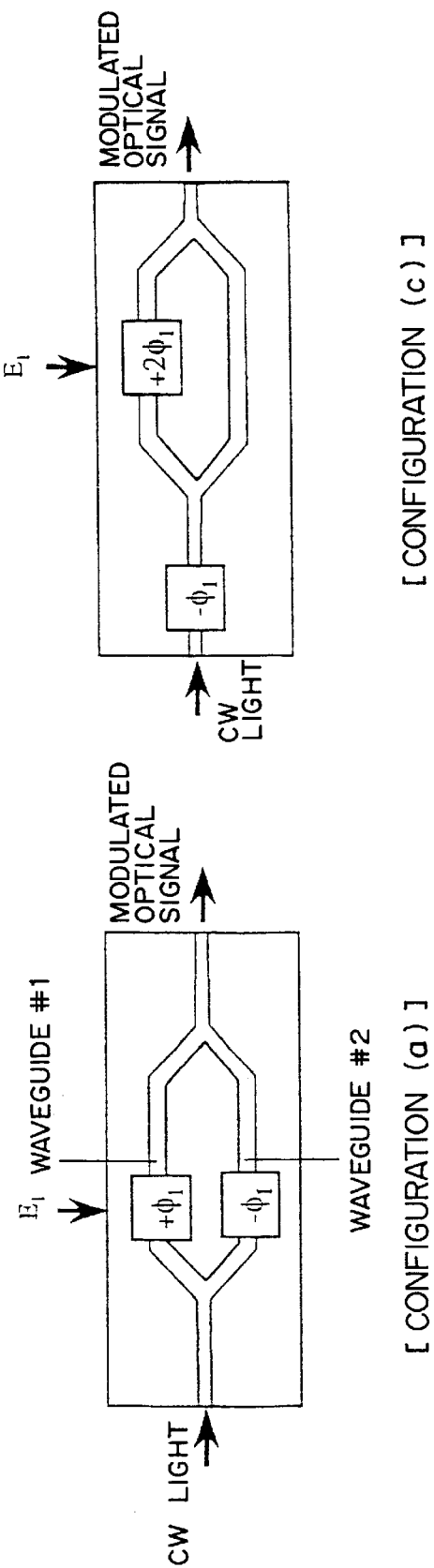
FIG. 15 shows an example of a principle configuration of a single-sided drive zero chirping modulator.

FIG. 15 shows an example of a configuration of a single-sided drive zero chirping modulator.

The disposition of electrodes in configuration examples (a) through (c) as shown in FIG. 15 is the same as that of the double-sided drive modulator as shown in FIGS. 9A through 9C, respectively. For similar reasons, phase modulation +$\phi_1$ is provided to the waveguide #1 and phase modulation −$\phi_1$ is provided to the waveguide #2 in all the configuration examples (a) through (c), resulting in that push-pull driving is performed and chirping of an output signal does not occur.

Since the zero chirping modulator achieves zero chirping regardless of the modulation method of an input driving signal, the zero chirping modulator can be used to increase dispersion tolerance in any modulation method which can be implemented by a single-sided drive modulator, such as NRZ modulation and RZ modulation.

Figure 16:
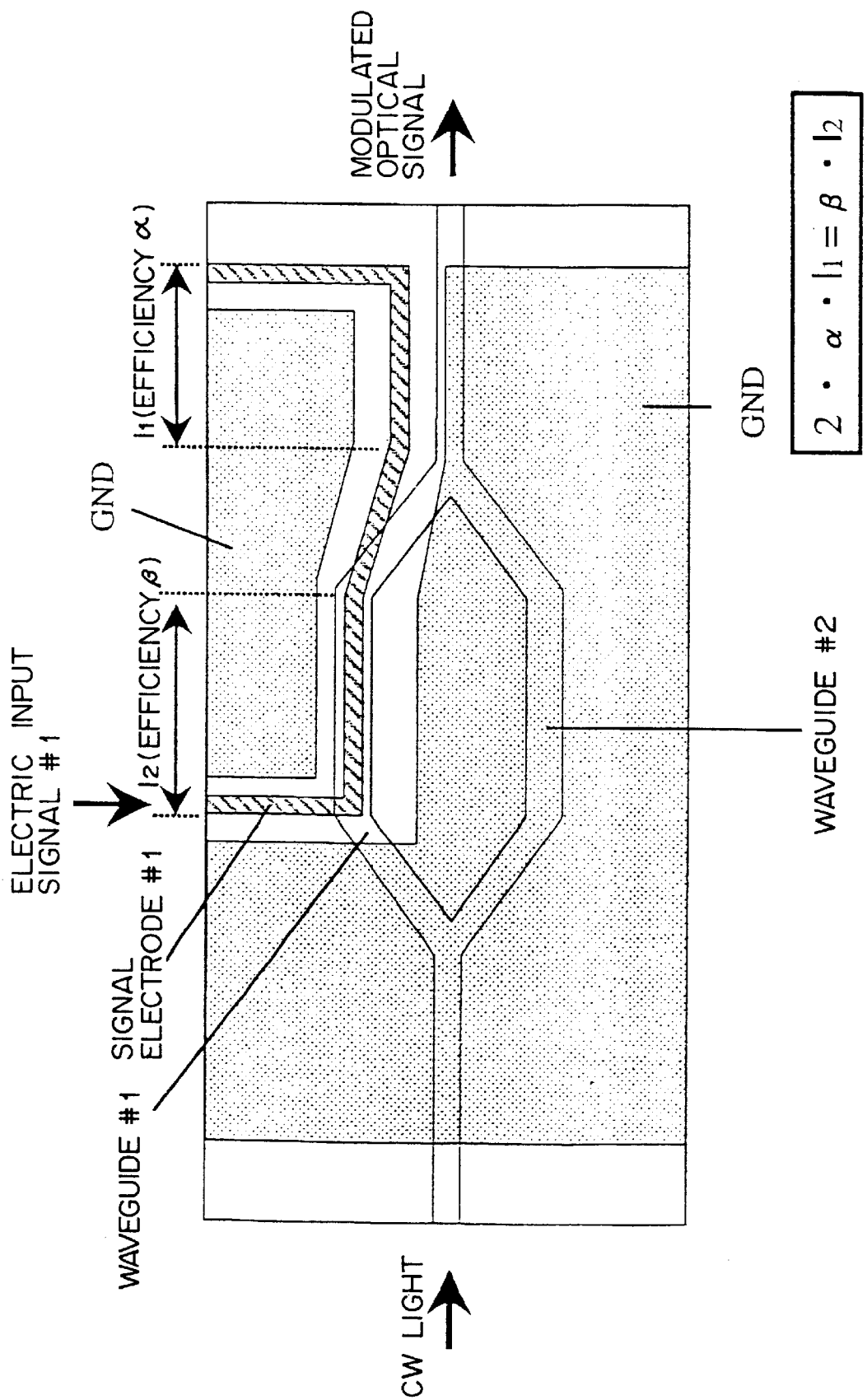
FIG. 16 shows an example of a specific configuration of the single-sided drive zero chirping modulator.

FIG. 16 shows an example of a specific configuration of a single-sided drive zero chirping modulator.

In response to the electric input signal #1, push-pull driving is performed based on the same principle as that for the modulator as shown in FIG. 10.

Figure 17:
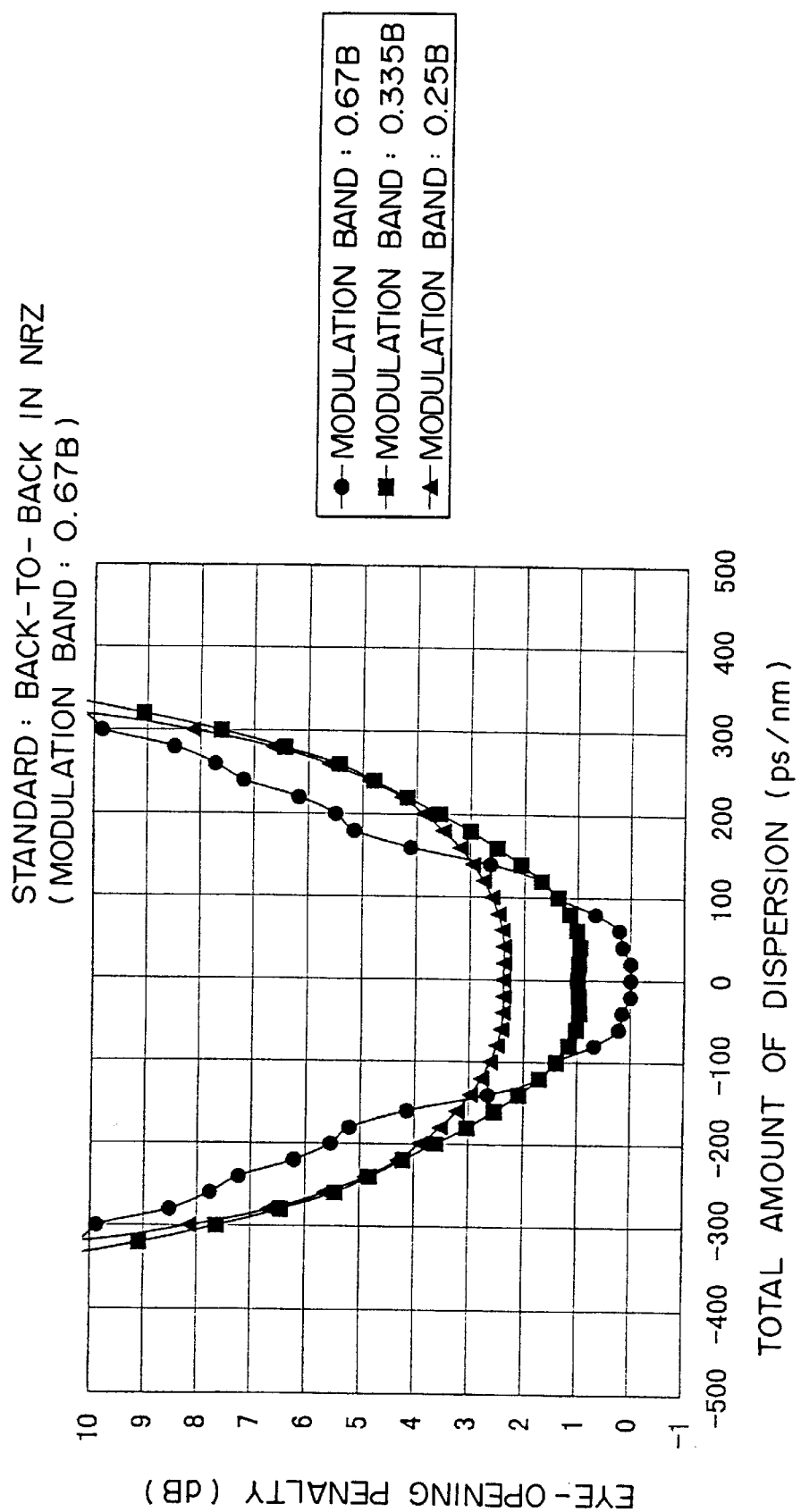
FIG. 17 shows dispersion tolerance for different modulation bands in the half-bit shift multiplexing modulation method in which the Mach-Zehnder optical modulator according to the embodiment of the present invention is used.
Figure 18:
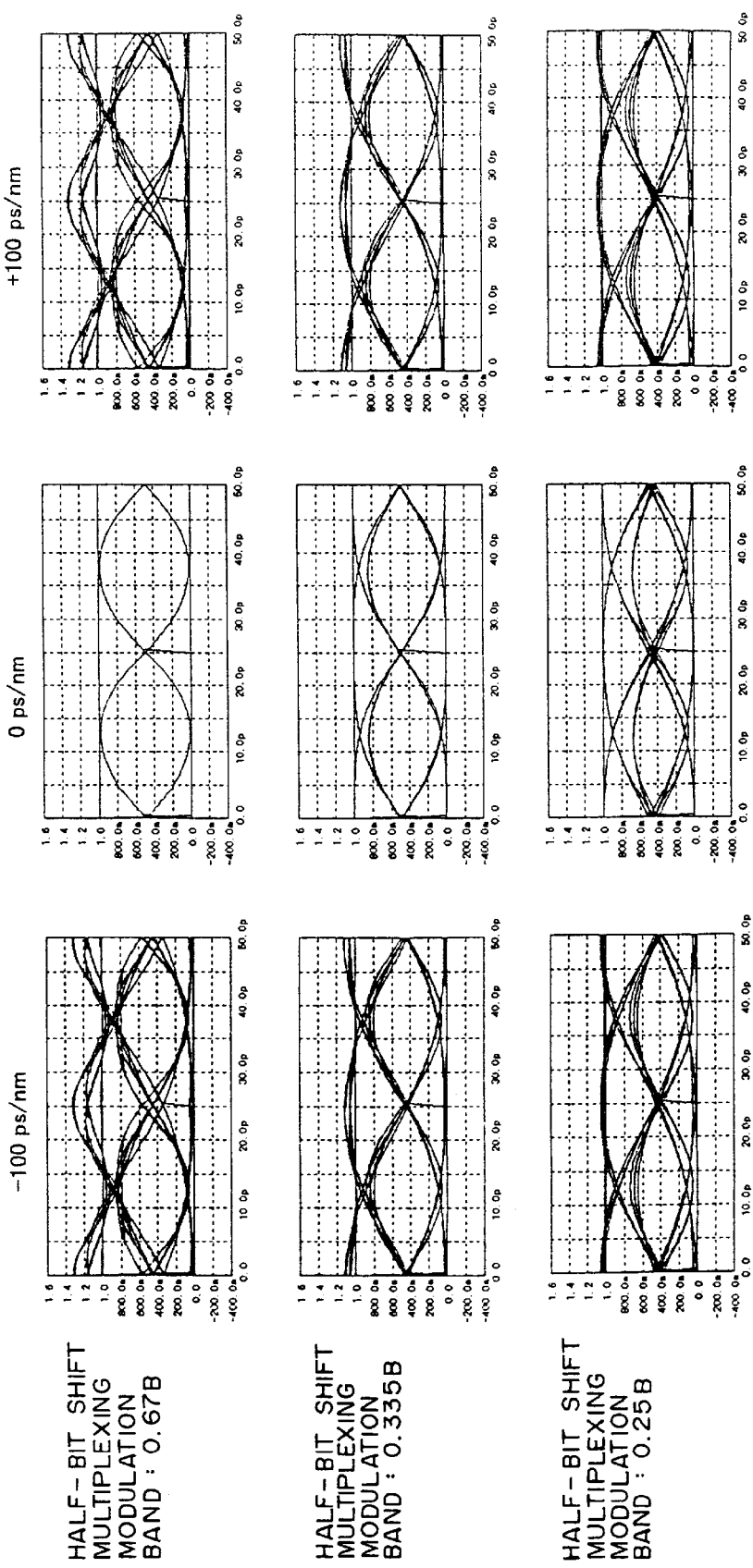
FIG. 18 presents eye diagrams showing output waveforms for different modulation bands in the half-bit shift multiplexing modulation method in which the Mach-Zehnder optical modulator according to the embodiment of the present invention is used.
Figure 19:
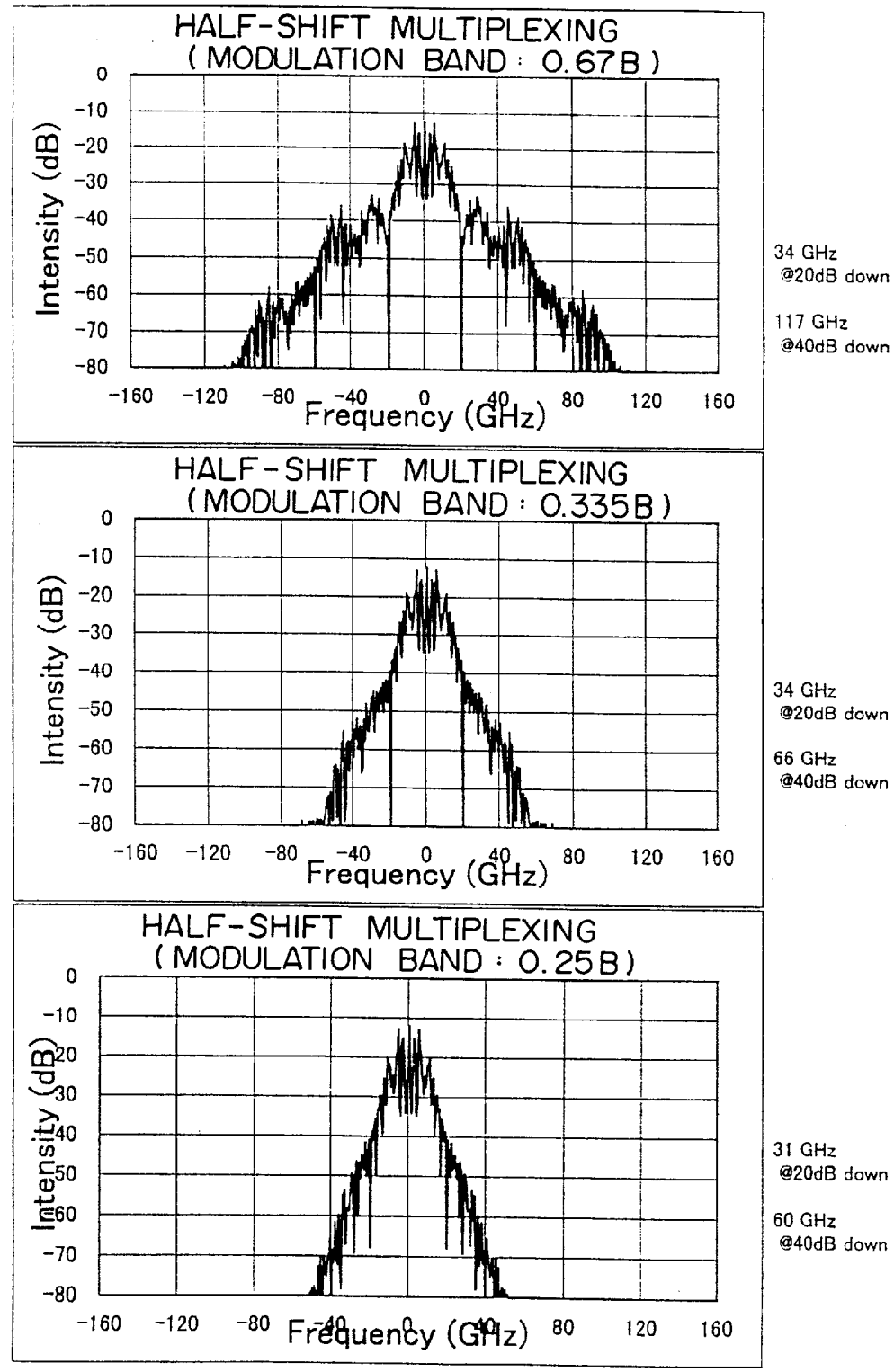
FIG. 19 shows the distribution of a spectrum of an optical signal generated in the half-bit shift multiplexing modulation method, in which the Mach-Zehnder optical modulator according to the embodiment of the present invention is used, for different modulation bands.

FIGS. 17 through 19 show comparisons of dispersion tolerance characteristics, light waveforms, and light spectrums between different modulation bands in the half-bit shift multiplexing modulation method to which the present embodiment is applied.

FIG. 17 shows dispersion tolerances for different modulation bands in the half-bit shift multiplexing modulation method to which the present embodiment is applied.

The eye-opening penalty as shown in FIG. 17 is measured on the basis of the eye-opening penalty for an output waveform in the case of zero dispersion of an NRZ signal where the modulation band is 0.67 B.

As shown in FIG. 17, in the half-bit shift multiplexing modulation, as the modulation band becomes narrower, the value of the eye-opening penalty in the vicinity of zero dispersion gets worse, however, as the total amount of dispersion increases, the eye-opening penalty decreases, that is, dispersion tolerance increases. Therefore, the half-bit shift multiplexing modulation method, to which the present embodiment is applied, allows a low-band electric device to operate, and increases dispersion tolerance by narrowing a modulation band. However, since a narrowed modulation band causes an increase in back-to-back intersymbol interference (of an input signal itself) as well as an improvement in dispersion tolerance, a band must be established in consideration of the trade-off thereof.

FIG. 18 presents eye diagrams showing output waveforms for different modulation bands in the half-bit shift multiplexing modulation method to which the present embodiment is applied.

As shown in FIG. 18, in the case of a dispersion of 0 ps/nm, intersymbol interference becomes larger as a modulation band becomes smaller, and even in the case of transmission through an optical fiber which causes a dispersion of −100 ps/nm or 100 ps/nm, little deterioration in a waveform occurs if a modulation band is narrow.

FIG. 19 shows distribution of a spectrum of an optical signal generated in the half-bit shift multiplexing modulation method, to which the present embodiment is applied, for different modulation bands.

As shown in FIG. 19, when the intensity equals the peak amount less 20 dB, the width of spectrum distribution is 34 GHz in the case of a modulation band of 0.67 B (B: a bit rate), 34 GHz in the case of a modulation band of 0.335 B, and 31 GHz in the case of a modulation band of 0.25 B. When the intensity equals the peak amount less 40 dB, the width of spectrum distribution is 117 GHz in the case of a modulation band of 0.67 B, 66 GHz in the case of a modulation band of 0.335 B, and 60 GHz in the case of a modulation band of 0.25 B. Thus, the effect of the dispersion characteristics of an optical fiber can be reduced and dispersion tolerance can be increased, by narrowing a modulation band and a spectrum width.

Figure 20A:
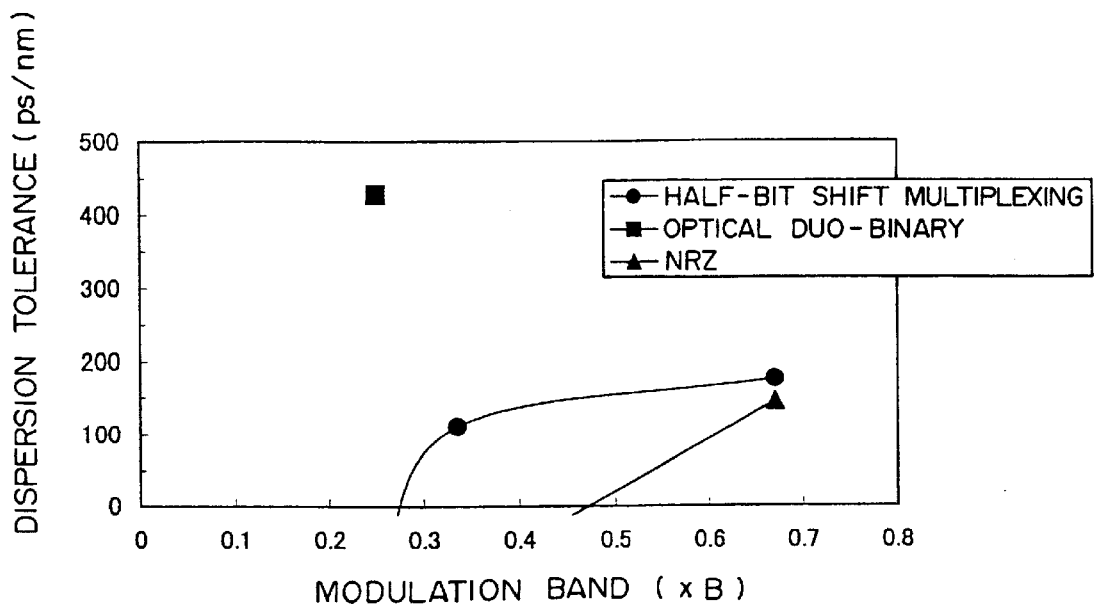
FIG. 20A shows the results of modulation band-to-dispersion tolerance calculation for each modulation method.
Figure 20B:
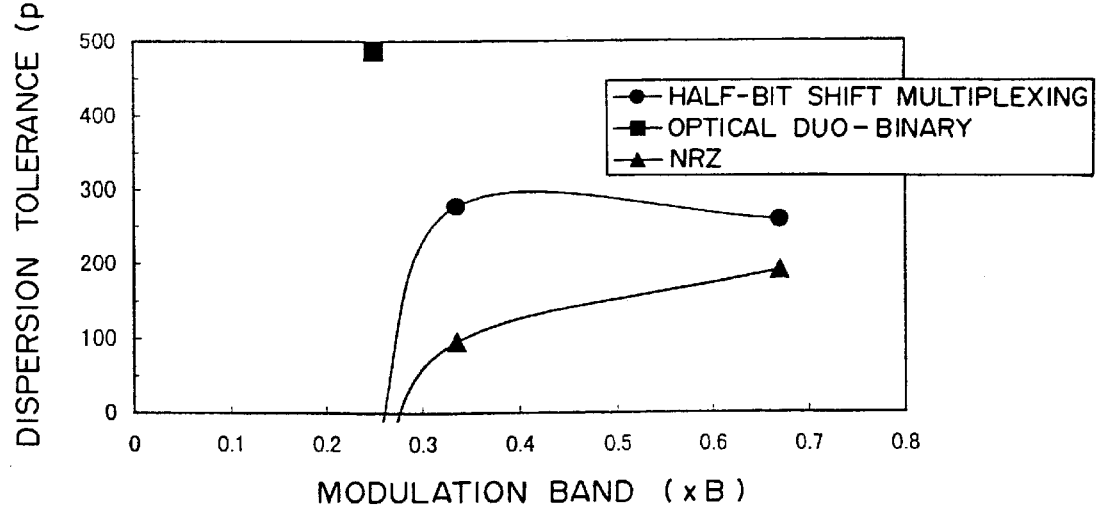
FIG. 20B shows the results of modulation band-to-dispersion tolerance calculation for each modulation method.

FIGS. 20A and 20B show results of modulation band-to-dispersion tolerance calculation in each modulation method.

The dispersion tolerance as shown in FIG. 20A is measured on the basis of a back-to-back eye-opening penalty of 1 dB or less in the NRZ modulation method. The dispersion tolerance as shown in FIG. 20B is measured on the basis of a back-to-back eye-opening penalty of 2 dB or less in the NRZ modulation method.

In the NRZ modulation method, dispersion tolerance cannot be increased by narrowing the band of signals. Meanwhile, in the half-bit shift multiplexing modulation method, although dispersion tolerance is not increased by narrowing a modulation band in the case of an eye-opening penalty of 1 dB or less, dispersion tolerance increases as a modulation band decreases not below 0.3 B (B: a bit rate) in the case of an eye-opening penalty of 2 dB or less. This indicates that dispersion tolerance cannot simply be increased by narrowing a modulation band since the narrowing of a modulation band reduces deterioration in a waveform caused by dispersion and increases back-to-back intersymbol interference, and there is a trade-off between the reduction in waveform deterioration and the increase in intersymbol interference. Therefore, a modulation band must be properly established in consideration of the trade-off between the reduction in waveform deterioration and the increase in intersymbol interference, which are caused by narrowing a modulation band. With respect to dispersion tolerance, the half-bit shift multiplexing modulation method, to which the present embodiment is applied, is not necessarily superior to the optical duo-binary modulation method. However, as shown in FIG. 20B, dispersion tolerance is improved by narrowing a modulation band in the case of an eye-opening penalty of 2 dB or less. Thus, dispersion tolerance can also be increased sufficiently in the half-bit shift multiplexing modulation method, by taking factors, such as the eye-opening penalty, intersymbol interference and deterioration in a waveform, into appropriate consideration.

According to the present embodiment of the present invention, an optical signal is generated in an optical transmitter which is used in an optical transmission system, by using an electronic device having an operating speed equal to half a bit rate, and chromatic dispersion tolerance of a transmission signal is increased by narrowing the band of a driving signal, resulting in that a longer-distance transmission can be achieved.

Figure 21:
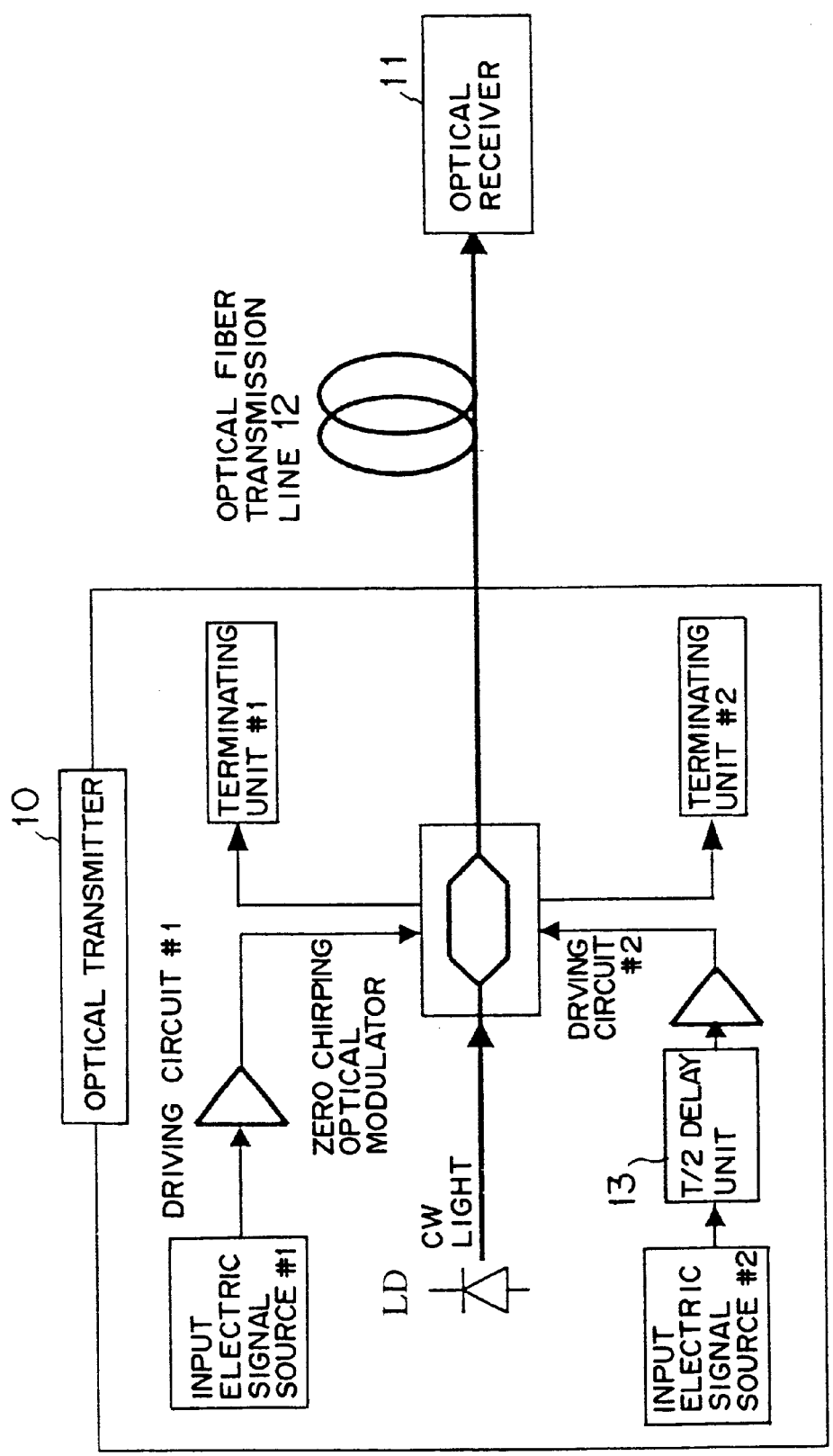
FIG. 21 shows an example of a configuration of an optical communication system using the half-bit shift multiplexing modulation method.

FIG. 21 shows an example of a configuration of an optical communication system using the half-bit shift multiplexing modulation method.

The optical communication system as shown in FIG. 21 comprises an optical transmitter 10, an optical fiber transmission line 12, and an optical receiver 11. The optical transmitter 10 extracts a modulated optical signal having a bit rate of B(b/s) from two independent input electric signals to be modulated, by using a double-sided electrode Mach-Zehnder optical modulator. The two independent input electric signals to be modulated have a bit rate of B/2(b/s) and an amplitude of $V\pi$, and there is a difference of half a cycle between the phases of the two independent input electric signals to be modulated. The optical communication system as shown in FIG. 21 differs from the system as shown in FIGS. 1 through 4E (Japanese Patent Laid-open No. 3-200923) in that the optical communication system as shown in FIG. 21 uses a zero chirping optical modulator which does not cause chirping of an output optical signal for either of the electric signals, which are inputted from input electric signal sources #1 and #2, to be modulated. Such a zero chirping optical modulator can be implemented by using an electrode configuration as shown in, for example, FIG. 10.

Each of the input electric signal sources #1 and #2 outputs an independent electric signal having a bit rate of B/2(b/s). The electric signal outputted from the input electric signal source #2 is inputted to a T/2 delay unit 13 which shifts the phase of a signal by half a bit, resulting in that compared to the phase of the electric signal outputted from the input electric signal source #1, the phase of the electric signal outputted from the input electric signal source #2 is delayed by half a bit. Subsequently, the electric signal outputted from the input electric signal source #2 is inputted to a driving circuit #2. Driving circuits #1 and #2 sufficiently amplify the amplitude of an electric signal inputted, to drive the zero chirping optical modulator. CW light outputted from a light source LD is inputted to the zero chirping optical modulator.

Then, part of the CW light undergoes phase modulation caused by a driving signal applied by the driving circuit #1 and the other part of the CW light undergoes phase modulation caused by a driving signal applied by the driving circuit #2. After being modulated by the driving signals, these parts of the CW light are coupled and converted into a light intensity modulated signal. Terminating units #1 and #2 terminate the driving electric signals outputted from the input electric signal sources #1 and #2, respectively. An output optical signal, which has a bit rate of B(b/s), is outputted from the zero chirping optical modulator after half-bit shift multiplexing modulation is performed. The output optical signal generated in this manner is sent to the optical receiver 11 through the optical fiber transmission line 12.

Figure 22:
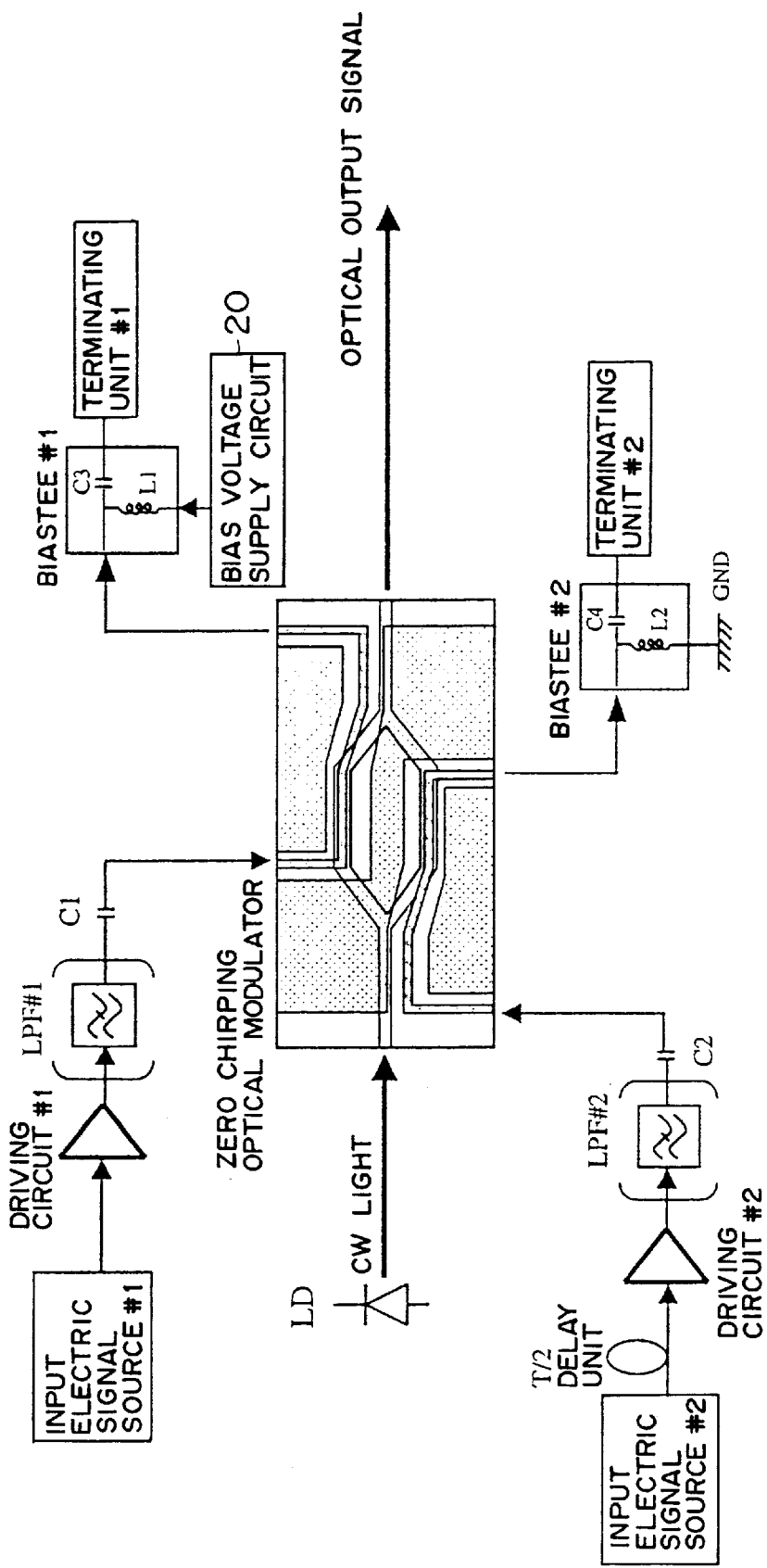
FIG. 22 shows an example of a detailed configuration of a zero chirping optical modulator of an optical transmitter as shown in FIG. 21.

FIG. 22 shows an example of a detailed configuration of the zero chirping optical modulator in the optical transmitter as shown in FIG. 21.

Figure 2:
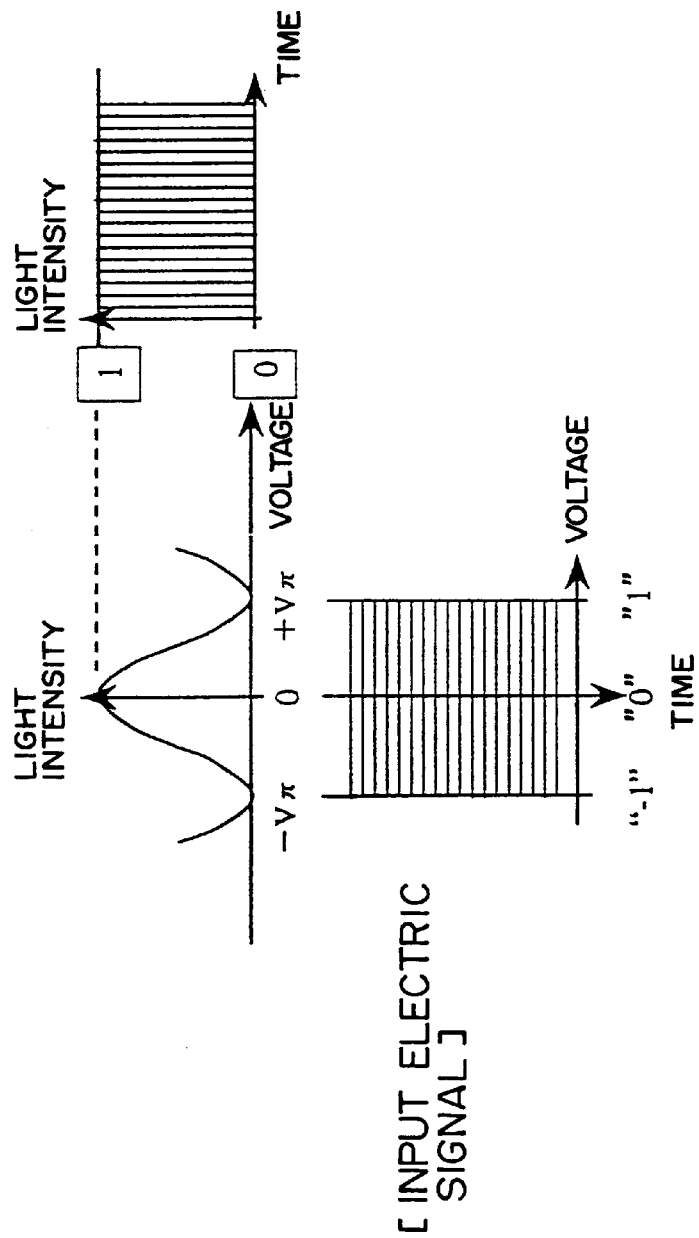
FIG. 2 explains a conventional modulation method.
Figure 4:
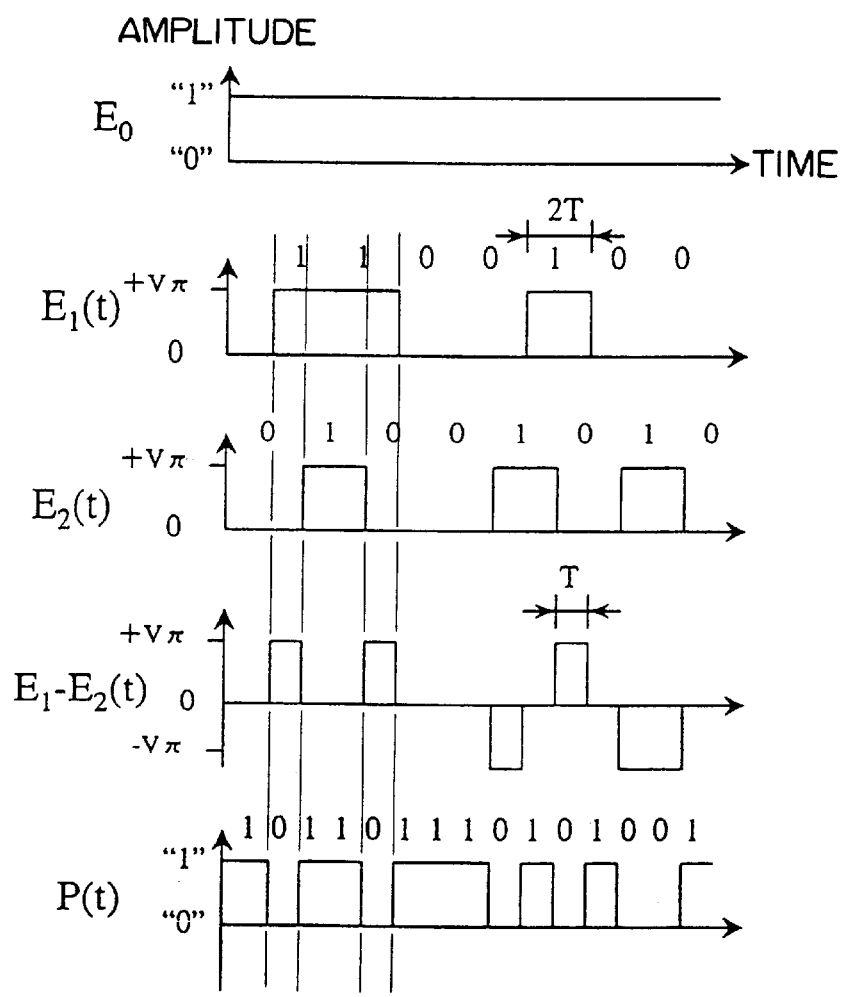
FIG. 4A explains a conventional modulation method.
FIG. 4B explains a conventional modulation method.
FIG. 4C explains a conventional modulation method.
FIG. 4D explains a conventional modulation method.
FIG. 4E explains a conventional modulation method.
Figure 5:
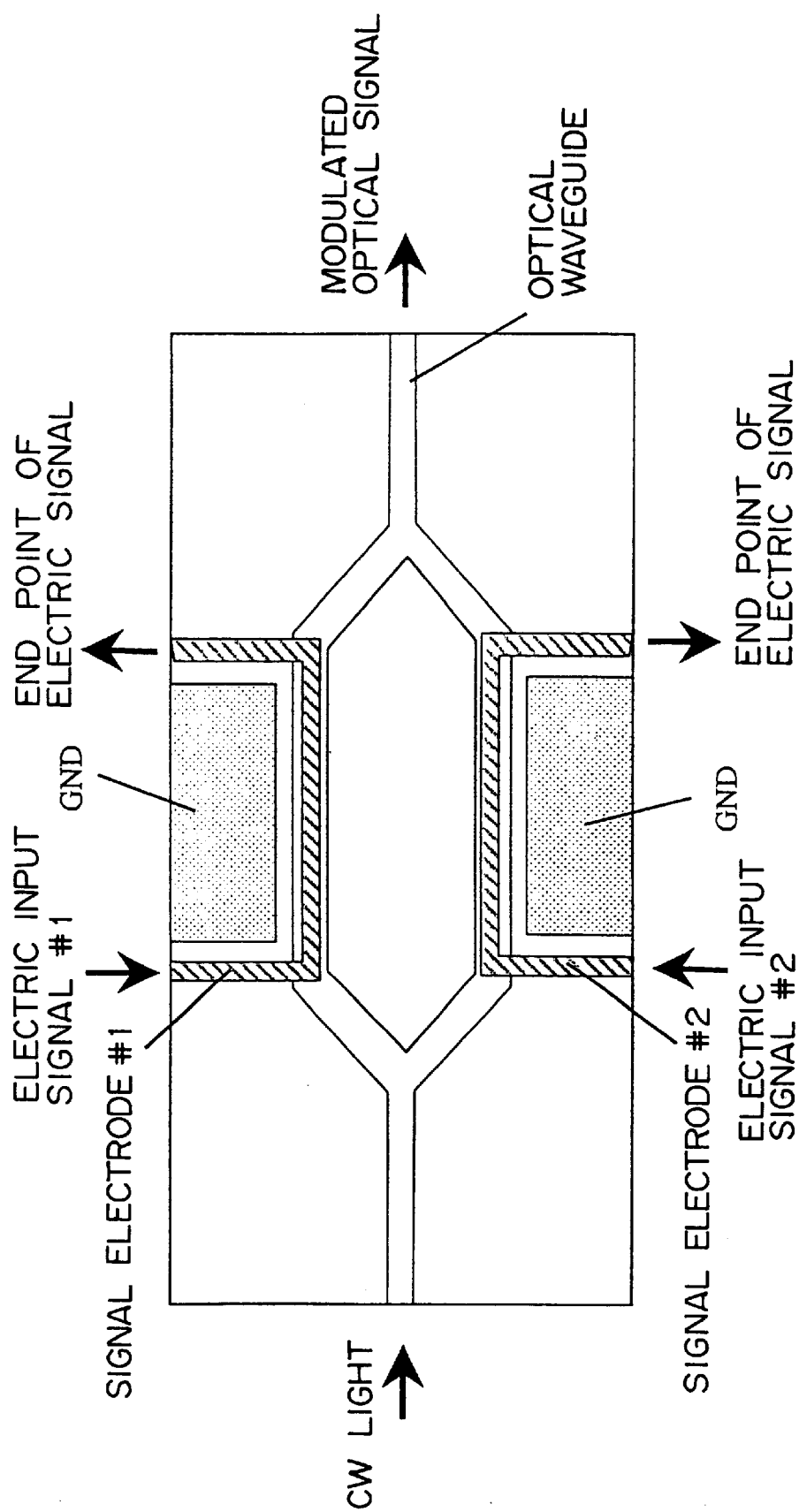
FIG. 5 shows a configuration of a double-sided electro de Mach-Zehnder optical modulator for use in the conventional half-bit shift multiplexing modulation method.

The time lag of half a time slot (half a bit) between the input electric signals outputted from the input electric signal sources #1 and #2 can be caused by, for example, adjusting the length of electric signal lines. Biastees #1 and #2 and terminating units #1 and #2, which are designed for high-speed signals, are used as electric output terminals of the zero chirping optical modulator. Here, the biastees #1 and #2 are used for supplying a bias voltage for setting the central voltage of the driving signal to a proper value with reference to the driving electric signal-to-light intensity characteristic curve as shown in FIG. 2 (reference to the bias voltage is omitted from the explanation of FIG. 2). Since optical modulation characteristics are affected only by a potential difference arising between two electrodes, only a bias voltage to be supplied to, for example, the biastee #1 need be adjusted by using a bias voltage supply circuit 20, and setting the DC potential to be supplied to the biastee #2 to 0 V. Capacitors C1 through C4 are used for insulating the bias voltages at their respective positions. Here, dispersion tolerance can be increased by narrowing the spectrum of an electric input signal, as described above. This also brings about the advantage of enabling the use of a low-band driving device. Low-pass filters (LPFs #1 and #2) as shown in FIG. 22 may be used so as to further optimize transmission characteristics by intentionally adjusting a band. To limit the band of an input electric signal, the LPFs #1 and #2 may be provided or, alternatively, the band of amplifiers in the driving circuits #1 and #2 may be limited so as to limit the band of the input electric signal. Therefore, FIG. 22 shows the LPFs #1 and #2 in parentheses since the LPFs #1 and #2 are not particularly required in the case in which the band of amplifiers in the driving circuits #1 and #2 are limited.

Since an operation for performing half-bit shift multiplexing modulation by providing a driving signal to the zero chirping optical modulator is described above, the explanation thereof is omitted here.

Figures 23A, 23B:
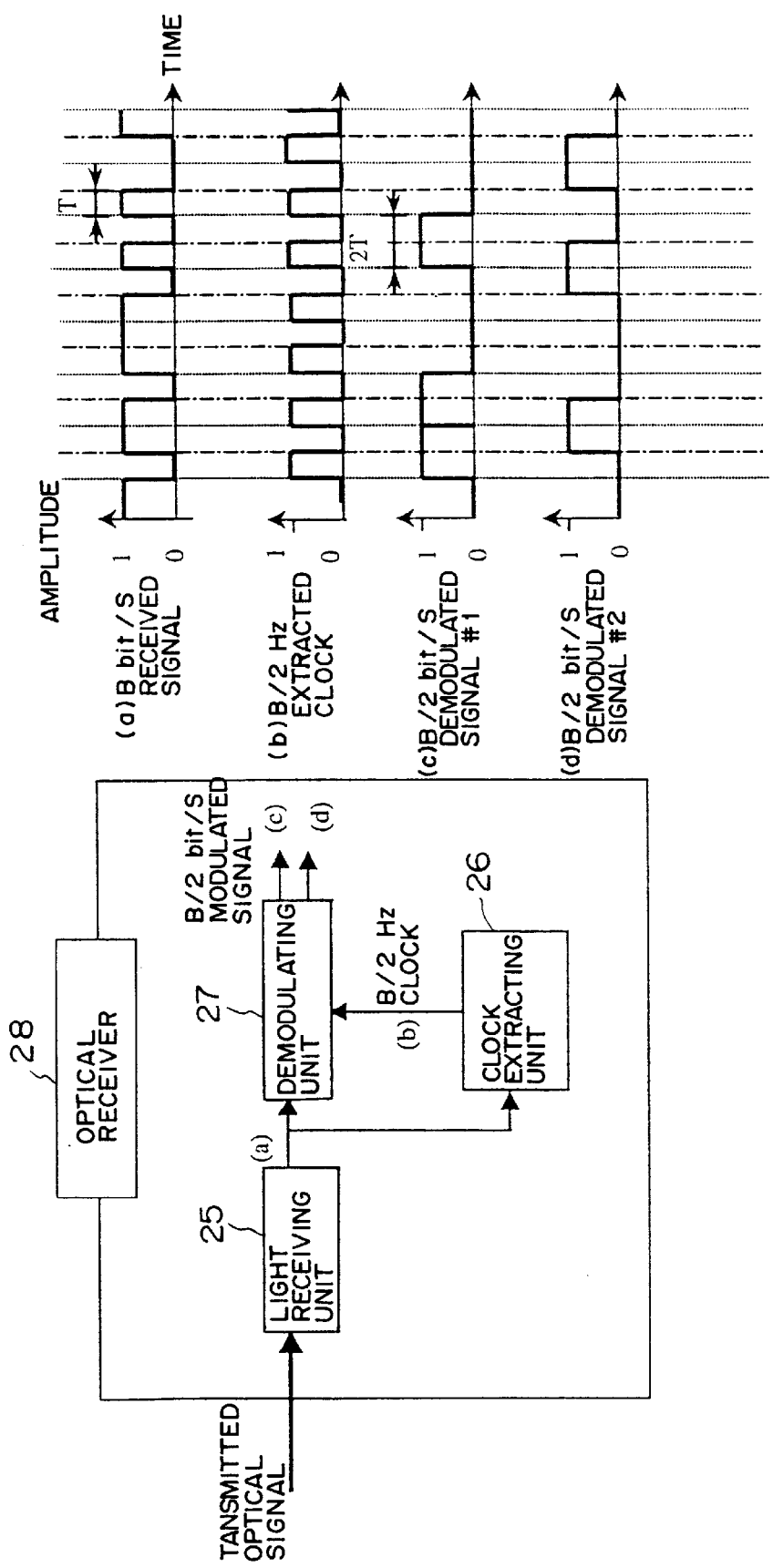
FIG. 23A shows an embodiment regarding an optical receiver configuration in the case of using the half-bit shift multiplexing modulation method.
FIG. 23B shows the embodiment regarding the optical receiver configuration in the case of using the half-bit shift multiplexing modulation method.

FIGS. 23A and 23B show an embodiment regarding an optical receiver configuration in the case of using the half-bit shift multiplexing modulation method.

As shown in FIG. 23A, an optical receiver 28 consists of a light receiving unit 25 which performs photoelectric conversion of a B(b/s) transmission optical signal, a clock extracting unit 26 which extracts a B/2(Hz) clock signal that is synchronized with an electric signal from part of the electric signal, and a demodulating unit 27 that demodulates two independent B/2(b/s) electric signals, which are identical to an electric signal inputted to a transmitter, from a B(b/s) electric signal. An example of demodulation principles is given as follows. As shown in FIG. 23B, two independent demodulated signals having a bit rate of B/2 (b/s) can be obtained by inverting a demodulation electric signal #1 if the rise or fall of a B(b/s) electric signal (a) is in an odd-numbered time position, or by inverting a demodulation electric signal #2 if the rise or fall of the B(b/s) electric signal (a) is in an even-numbered time position, assuming that all the time positions that are set at intervals of one time slot (T=1/B sec) are numbered. Whether the rise/fall of the B(b/s) electric signal (a) is in an odd-numbered time position or even-numbered time position can be determined in comparison with the phase of an extracted B/2(Hz) clock (b) since the time of rise/fall of the B(b/s) electric signal (a) coincides with that of the B/2(Hz) clock (b).

Figure 25:
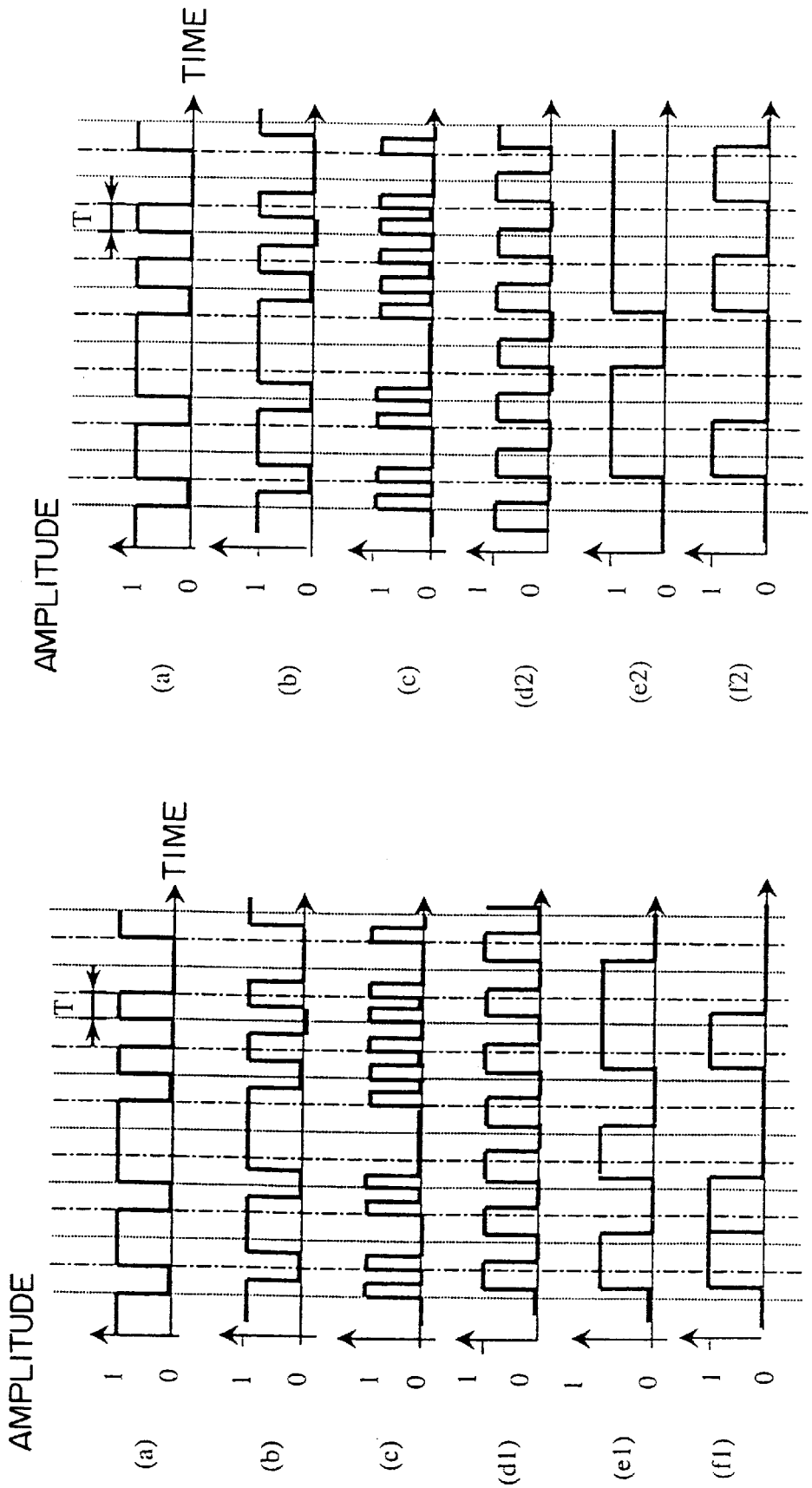
FIG. 25 shows an example of a configuration of a circuit to implement the demodulation method as shown in FIGS. 23A and 23B and detailed operations thereof (No. 2).

FIGS. 24 and 25 show examples of a configuration of a circuit to implement the demodulation method as shown in FIGS. 23A and 23B and detailed operations thereof.

An optical signal having a bit rate of B(b/s) is received by a light receiving unit 30, and is converted into an electric signal. An example of electric signals which are outputted from the light receiving unit 30 is shown as (a) in FIG. 25. The time slot length corresponding to one bit of the electric signal is given by T=1/B (sec). To detect the rise and fall (edge) of the received electric signal, an edge detecting unit 35 consisting of a T/2 delay unit 31 and an EX-OR 32 is provided in the circuit. The received electric signal is branched in the edge detecting unit 35. Part of the branched electric signal is delayed by the T/2 delay unit 31 for T/2, and is inputted to the logical circuit EX-OR (Exclusive-or) 32. Operations of the EX-OR 32 are shown in Table 2 below.

TABLE 2

|  | | Signal(b) | |
| --- | --- | --- | --- |
| [EX-OR] | | 0 | 1 |
| Signal(a) | 0 | 0 | 1 |
|  | 1 | 1 | 0 |

As a result, a signal for extracting an edge, which becomes "1" at the position of an edge as shown in FIG. 25(c), is generated. To determine whether a time position of the pulse of the signal for extracting an edge is an even-numbered time position or odd-numbered time position, assuming that all the time positions that are set at intervals of T are numbered, the output from the EX-OR 32 is divided into two, and the divided portions are inputted to logical circuits D-FFs (D-type flip-flops) in an even/odd-numbered edge detecting unit 36, together with B/2(Hz) clocks (d1) and (d2), respectively, which are outputted from a clock extracting unit 33. With regard to clock signals outputted from the clock extracting unit 33, a clock which is generated by an inverter 34 inverting the pulse of the B/2(Hz) clock (d1) is used as the B/2(Hz) clock (d2) so that the B/2(Hz) clocks (d1) and (d2) are mutually in opposite phases. The signal waveforms of the clocks (d1) and (d2) are shown as (d1) and (d2) in FIG. 25. Note that the phases of the clocks (d1) and (d2) are adjusted so that the rise of the clock (d1) and that of the clock (d2) are in an even-numbered time position and an odd-numbered time position, respectively. Operations of the D-FFs #1 and #2 are shown in Table 3 below.

TABLE 3

|  [D-FF] |  | At the time of rise of clock |
| --- | --- | --- |
| Signal(c) | 0 | 0 |
| Data | 1 | 1 |

Consequently, as indicated by signals (e1) and (e2) shown in FIG. 25, the D-FFs #1 and #2 maintain the value of "1" or "0", depending on whether the signal (c) is "1" or "0" at the time of the rise of the clocks (d1) and (d2), respectively. In other words, the signals (e1) and (e2) become "1" when a pulse of the signal (c), that is, an edge of the signal (a) is in an odd-numbered time position and an even-numbered time position, respectively, and the signals (e1) and (e2) become "0" when a pulse of the signal (c), that is, an edge of the signal (a) is in an even-numbered time position and an odd-numbered time position, respectively. Then, the signals (e1) and (e2) are inputted to EX-ORs #1 and #2 of an inverting unit 37. The EX-ORs #1 and #2 are circuits that implement an EXCLUSIVE-OR operation with respect to the signals of one previous time slot (2T sec), which are inputted after being delayed by 2T delay units 38 and 39, and signals inputted from the D-FFs #1 and #2, and invert and output the signals inputted from the 2T delay units 38 and 39 when the signals inputted from the D-FFs #1 and #2 are "1". When input data signals (1 time slot=2T) having a bit rate of B/2(b/s) and output data signals are considered a progression an and a progression $b_n$, respectively (n represents time sequence of the time slot of an input signal: an output data signal of one time slot before is represented as $b_{n-1}$), the relationship as shown in Table 4 below exists between $a_n$ and $b_n$.

TABLE 4

|  | $b_n$ | Input #2 = $a_n$ | |
| --- | --- | --- | --- |
|  |  | 0 | 1 |
| Input # 1 = $b_{n-1}$ | 0 | 0 | 1 |
|  | 1 | 1 | 0 |

Accordingly, Input $a_n=0 \rightarrow b_n=b_{n-1}$ (An output signal does not change.)
Input $a_n=1 \rightarrow b_n=1-b_{n-1}$ (An output signal is inverted.)

As a result, two independent demodulation electric signals (f1) and (f2) having a bit rate of B/2(b/s), which are identical to an electric signal inputted to the transmitter, are obtained.

Thus, the original signal can be regenerated because the half-bit shift multiplexing modulation is equivalent to modulation of the signal (f1) and the signal (f2) which was shifted by half a bit, based on the following table.

TABLE 5

| Half-bit shift multiplexing modulation signal |  | Applied signal (f2) | |
| --- | --- | --- | --- |
|  |  | 1 | 0 |
| Applied signal (f1) | 0 | 1 | 0 |
|  | 1 | 0 | 1 |

An example of the half-bit shift multiplexing modulation, by which the signal (a) is obtained from the signals (f1) and (f2) as shown in FIG. 25, is given below. To begin with, when the signal (f1) having a time slot of 2T(sec) rises, the signal (a) becomes "0" because the signal (f2) having a time slot of 2T(sec), which was delayed for T(sec), has not risen yet. When the signal (f2) rises after T(sec) from the rise of the signal (f1), the signal (a) becomes "1" as shown in Table 5. If the signal (f2) does not rise, the signal (a) remains "0". As shown in Table 5, when the signal (a) is "1", both the signals (f1) and (f2) are either "1" or "0", and when the signal (a) is "0", one of the signals (f1) and (f2) is "1" and another is "0". Since the signals (f1) and (f2) undergo half-bit shift multiplexing at the transmitting end, the signal (f2) becomes "1" if the signal (f1) rises at "1" while the signal (a) is "1" and if the signal (a) still remains "1" after T(sec) from the rise of the signal (f1), that is, if the signal (a) has no edge. Similarly, the signal (f2) changes from "1" to "0" if the signal (a) is "0" after T(sec) from the rise of the signal (f1) at "1", that is, if the signal (a) has an edge. This is because the signal (f1) does not change after T(sec) from the rise thereof.

Therefore, to regenerate two original signals from the signal (a), it is necessary to know whether there is an edge in every 2T which is a cycle of the signal (f1) and whether there is an edge in every 2T which is a cycle of the signal (f2) that is delayed for T. In the present embodiment, the signal (c) is provided so as to specify the time position of an edge of the signal (a), and the signals (e1) and (e2) are provided so as to cause changes in the signals (f1) and (f2) in a cycle of 2T. The signal (e1) is used for determining whether there is an edge, such as a rise, of the signal (a) in every time slot of 2T(sec) which is a cycle of the signal (a). Since the signal (f2) is originally shifted by half a bit, the signal (f2) remains unchanged when the signal (f1) changes. Therefore, if there is an edge in every cycle of 2T(sec), this indicates that the signal (f1) has changed, and if an edge of the signal (a) does not exist, this indicates that the signal (f1) remains unchanged. The signal (e2) is provided for a similar purpose to that for the signal (e1). If an edge of the signal (a) exists at any of the points in time which are set at intervals of 2T(sec), beginning at T(sec) from the generation of the signal (a), this indicates that the signal (f2) has changed, and if an edge of the signal (f2) does not exist, this indicates that the signal (f2) remains unchanged. Thus, the signals (e1) and (e2) indicate whether there is any change in the signals (f1) and (f2), respectively.

According to the present invention, an optical signal having a bit rate which is the double of that of a signal generated by an electric circuit is generated and transmitted by using optical modulation. The optical modulation according to the present invention prevents chirping of modulated light, and reduces deterioration in a waveform or deterioration in an eye-opening penalty that an optical signal sustains because of the chromatic dispersion characteristics of an optical fiber, thereby contributing much to the realization of long-distance and high-speed optical communications.

What is claimed is:

1. An apparatus for optical modulation using a branch interferometric optical modulator in which an optical waveguide having first and second branch optical waveguides is provided on a substrate having electro-optical effect and in which first and second signal electrodes are placed in the first and second branch optical waveguides, respectively, so as to cause a phase difference between light that is transmitted through the first branch optical waveguide and light that is transmitted through the second branch optical waveguide, said apparatus comprising:

a first driving unit which applies a first driving signal having a prescribed bit rate to the first signal electrode of the branch interferometric optical modulator; and a second driving unit which applies a second driving signal having the prescribed bit rate to the second signal electrode of the branch interferometric optical modulator, the second driving signal having a phase which is different from a phase of the first driving signal by half a time slot, wherein modulated light having a bit rate which is double the prescribed bit rate is obtained by applying the first driving signal and the second driving signal, and dispersion tolerance is increased by making an optical signal ternary so as to narrow a band of the optical signal.

2. The apparatus for optical modulation according to claim 1, wherein signals of a narrow spectrum band, a bandwidth of which is equal to or less than a bit rate of an optical signal generated by the apparatus for optical modulation, are used as the first and second driving signals so as to increase dispersion tolerance of the optical signal.

3. The apparatus for optical modulation according to claim 2, wherein the first and second driving signals are generated to be narrow-spectrum band signals by using a driving electronic device of a low upper cut-off frequency, a bandwidth of which is equal to or less than a bit rate of an optical signal generated by the apparatus for optical modulation, so as to increase dispersion tolerance of the optical signal.

4. The apparatus for optical modulation according to claim 2, wherein the first and second driving signals are inputted to a low-pass filter of a low upper cut-off frequency, a bandwidth of which is equal to or less than a bit rate of an optical signal generated by the apparatus for optical modulation, so that the first and second driving signals become narrow-spectrum band signals, thereby increasing dispersion tolerance of the optical signal.

5. A Mach-Zehnder optical modulator in which an optical waveguide having first and second light paths is provided on a substrate having electro-optical effect and in which a signal electrode is placed in the first light path to cause a phase difference between light that is transmitted through the first light path and light that is transmitted through the second light path, said Mach-Zehnder optical modulator comprising:

at least one phase modulation electrode which provides phase modulation to light being transmitted through at least one of the first and second light paths provided in the Mach-Zehnder optical modulator; and at least one driving circuit, coupled to said at least one phase modulation electrode, supplying a first driving signal to light passing through the first light path that imparts chirping with a phase offset to substantially cancel the chirping after the light passing through the first light path and light passing through the second light path are coupled by the optical waveguide, thereby increasing dispersion tolerance.

6. The optical modulator according to claim 5, wherein said electrodes are configured so that optical modulation of the first driving signal performed by the Mach-Zehnder optical modulator becomes push-pull modulation.

7. The optical modulator according to claim 5, wherein after coupling, the light passing through the first and second light paths produces a ternary optical signal.

8. The optical modulator according to claim 7, wherein said phase modulation electrode applies half-bit shift multiplexing modulation.

9. A Mach-Zehnder optical modulator in which an optical waveguide having first and second light paths is provided on a substrate having electro-optical effect and in which first and second signal electrodes are placed in the first and second light paths, respectively, to receive first and second driving signals causing a phase difference between light that is transmitted through the first light path and light that is transmitted through the second light path, said Mach-Zehnder optical modulator comprising:

a third electrode which provides phase modulation to light being transmitted through one or both of the first and second light paths provided in the Mach-Zehnder optical modulator; and a driving circuit coupled to supply a third driving signal to said third electrode so that chirping imparted by the first, second and third driving signals to light passing through the first and second light paths are offset by each other after the light passing through the first light path and the light passing through the second light path are coupled by the optical waveguide, thereby increasing dispersion tolerance.

10. The optical modulator according to claim 9, wherein said electrodes are configured so that both optical modulation of the first driving signal and optical modulation of the second driving signal, performed by the Mach-Zehnder optical modulator, become push-pull modulation.

11. The optical modulator according to claim 9, wherein after coupling, the light passing through the first and second light paths produces a ternary optical signal.

12. The optical modulator according to claim 11, wherein said phase modulation electrode applies half-bit shift multiplexing modulation.

13. A method for optical modulation using a branch interferometric optical modulator in which an optical waveguide having first and second branch optical waveguides is provided on a substrate having electro-optical effect and in which first and second signal electrodes are placed in the first and second branch optical waveguides, respectively, so as to cause a phase difference between light that is transmitted through the first branch optical waveguide and light that is transmitted through the second branch optical waveguide, said method comprising:

(a) applying a first driving signal having a prescribed bit rate to the first signal electrode of the branch interferometric optical modulator; and (b) applying a second driving signal having the prescribed bit rate to the second signal electrode of the branch interferometric optical modulator, the second driving signal having a phase which is different from a phase of the first driving signal by half a time slot, wherein modulated light having a bit rate which is double the prescribed bit rate is obtained by applying the first driving signal and the second driving signal, and dispersion tolerance is increased by making an optical signal ternary so as to narrow a band of the optical signal.

14. The method for optical modulation according to claim 13, wherein signals of a narrow spectrum band, a bit rate of which is equal to or less than a bit rate of an optical signal generated by using the method for optical modulation, are used as the first and second driving signals so as to increase dispersion tolerance of the optical signal.

15. The method for optical modulation according to claim 14, wherein the first and second driving signals are generated to be narrow-spectrum band signals by using a driving electronic device of a low upper cut-off frequency, a bandwidth of which is equal to or less than a bit rate of an optical signal generated by using the method for optical modulation, so as to increase dispersion tolerance of the optical signal.

16. The method for optical modulation according to claim 14, wherein the first and second driving signals are put into a low-pass filter of a low upper cut-off frequency, a bandwidth of which is equal to or less than a bit rate of an optical signal generated by using the method for optical modulation, so that the first and second driving signals become narrow-spectrum band signals, thereby increasing dispersion tolerance of the optical signal.

17. A method for optical modulation using a Mach-Zehnder optical modulator in which an optical waveguide having first and second light paths is provided on a substrate having electro-optical effect and in which a first signal electrode is placed in the first light path so as to cause a phase difference between light that is transmitted through the first light path and light that is transmitted through the second light path, said method comprising:

providing phase modulation to light being transmitted through one or both of the first and second light paths provided in the Mach-Zehnder optical modulator so that chirping imparted by a first driving signal to light passing through the first light path is offset after the light passing through the first light path and light passing through the second light path are coupled, thereby increasing dispersion tolerance.

18. The method for optical modulation according to claim 17, wherein said electrodes are configured so that optical modulation of the first driving signal performed by the Mach-Zehnder optical modulator becomes push-pull modulation.

19. The optical modulator according to claim 17, wherein after coupling, the light passing through the first and second light paths produces a ternary optical signal.

20. The optical modulator according to claim 19, wherein said phase modulation electrode applies half-bit shift multiplexing modulation.

21. A method for optical modulation using a Mach-Zehnder optical modulator in which an optical waveguide having first and second light paths is provided on a substrate having electro-optical effect and in which first and second signal electrodes are placed in the first and second light paths, respectively, so as to cause a phase difference between light that is transmitted through the first light path and light that is transmitted through the second light path, said method comprising:

providing phase modulation to light being transmitted through one or both of the first and second light paths provided in the Mach-Zehnder optical modulator so that chirping imparted by a first driving signal to light passing through the first light path and chirping imparted by a second driving signal to light passing through the second light path are offset by each other after the light passing through the first light path and the light passing through the second light path are coupled, thereby increasing dispersion tolerance.

22. The method for optical modulation according to claim 21, wherein said electrodes are configured so that both optical modulation of the first driving signal and optical modulation of the second driving signal, performed by the Mach-Zehnder optical modulator, become push-pull modulation.

23. The optical modulator according to claim 21, wherein after coupling, the light passing through the first and second light paths produces a ternary optical signal.

24. The optical modulator according to claim 23, wherein said phase modulation electrode applies half-bit shift multiplexing modulation.

25. An optical transmitter using a branch interferometric optical modulator in which an optical waveguide having first and second branch optical waveguides is provided on a substrate having electro-optical effect and in which first and second signal electrodes are placed in the first and second branch optical waveguides, respectively, so as to cause a phase difference between light that is transmitted through the first branch optical waveguide and light that is transmitted through the second branch optical waveguide, said optical transmitter comprising:

a first driving unit which applies a first driving signal having a prescribed bit rate to the first signal electrode of the branch interferometric optical modulator; and a second driving unit which applies a second driving signal having the prescribed bit rate to the second signal electrode of the branch interferometric optical modulator, the second driving signal having a phase which is different from a phase of the first driving signal by half a time slot, wherein modulated light having a bit rate which is double the prescribed bit rate is obtained by applying the first driving signal and the second driving signal, and dispersion tolerance is increased by making an optical signal ternary so as to narrow a band of the optical signal.

26. An optical transmitter using a Mach-Zehnder optical modulator in which an optical waveguide having first and second light paths is provided on a substrate having electro-optical effect and in which a signal electrode is placed in the first light path to cause a phase difference between light that is transmitted through the first light path and light that is transmitted through the second light path, said optical transmitter comprising:

at least one phase modulation electrode which provides phase modulation to light being transmitted through at least one of the first and second light paths provided in the Mach-Zehnder optical modulator; and at least one driving circuit, coupled to said at least one phase modulation electrode, supplying a first driving signal to light passing through the first light path that imparts chirping with a phase offset to substantially cancel the chirping after the light passing through the first light path and light passing through the second light path are coupled by the optical waveguide, thereby increasing dispersion tolerance.

27. An optical transmitter using a Mach-Zehnder optical modulator in which an optical waveguide having first and second light paths is provided on a substrate having electro-optical effect and in which first and second signal electrodes are placed in the first and second light paths, respectively, to receive first and second driving signals causing a phase difference between light that is transmitted through the first light path and light that is transmitted through the second light path, said optical transmitter comprising;

a third electrode which provides phase modulation to light being transmitted through one or both of the first and second light paths provided in the Mach-Zehnder optical modulator; and a driving circuit coupled to supply a third driving signal to said third electrode so that chirping imparted by the first, second and third driving signals to light passing through the first and second light paths are offset by each other after the light passing through the first light path and the light passing through the second light path are coupled by the optical waveguide, thereby increasing dispersion tolerance.

28. The optical modulator according to claim 27, wherein after coupling, the light passing through the first and second light paths produces a ternary optical signal.

29. The optical modulator according to claim 28, wherein said phase modulation electrode applies half-bit shift multiplexing modulation.

* * * * *